(12) United States Patent
Brown

(10) Patent No.: US 7,993,553 B2
(45) Date of Patent: Aug. 9, 2011

(54) FILLED POLYMER COMPOSITE AND SYNTHETIC BUILDING MATERIAL COMPOSITIONS

(75) Inventor: Wade Brown, Fort Myers, FL (US)

(73) Assignee: Century-Board USA LLC, Fort Myers, FL (US)

( * ) Notice: Subject to any disclaimer, the term of this patent is extended or adjusted under 35 U.S.C. 154(b) by 791 days.

(21) Appl. No.: 11/407,661

(22) Filed: Apr. 20, 2006

(65) Prior Publication Data

US 2006/0186572 A1 Aug. 24, 2006

Related U.S. Application Data

(63) Continuation of application No. 10/764,012, filed on Jan. 23, 2004, now Pat. No. 7,763,341.

(51) Int. Cl.
*B29C 44/04* (2006.01)

(52) U.S. Cl. ............. 264/45.3; 264/172.19; 264/177.17; 425/115

(58) Field of Classification Search ............... 264/166, 264/45.3, 172.19, 177.17; 366/144, 149; 425/115
See application file for complete search history.

(56) References Cited

U.S. PATENT DOCUMENTS

| | | | |
|---|---|---|---|
| 529,535 A * | 11/1894 | Smith | ............... 425/218 |
| 529,538 A | 11/1894 | Vaughn | |
| 2,817,875 A | 12/1957 | Harris et al. | |
| 2,983,693 A | 5/1961 | Sievers | |
| 3,065,500 A | 11/1962 | Berner | |
| 3,071,297 A | 1/1963 | Lee | |
| 3,078,512 A | 2/1963 | De Haven | |
| 3,262,151 A * | 7/1966 | Oxel | ............... 425/193 |
| 3,269,961 A | 8/1966 | Bruson et al. | |
| 3,308,218 A * | 3/1967 | Wiegand et al. | ............... 264/121 |
| 3,466,705 A | 9/1969 | Richie | |
| 3,528,126 A | 9/1970 | Ernst et al. | |
| 3,566,448 A | 3/1971 | Ernst | |
| 3,644,168 A | 2/1972 | Bonk et al. | |
| 3,698,731 A | 10/1972 | Jost et al. | |
| 3,726,624 A | 4/1973 | Schwarz | |
| 3,736,081 A | 5/1973 | Yovanvich | |

(Continued)

FOREIGN PATENT DOCUMENTS

CA 2 037 130 C 1/2006

(Continued)

OTHER PUBLICATIONS

Office Action Issued in U.S. Appl. No. 11/691,449 on Jun. 30, 2008.

(Continued)

*Primary Examiner* — Joseph S Del Sole
*Assistant Examiner* — Timothy Kennedy
(74) *Attorney, Agent, or Firm* — Knobbe, Martens, Olson & Bear, LLP

(57) ABSTRACT

The invention relates to composite compositions having a matrix of polymer networks and dispersed phases of particulate or fibrous materials. The matrix is filled with a particulate phase, which can be selected from one or more of a variety of components, such as fly ash particles, axially oriented fibers, fabrics, chopped random fibers, mineral fibers, ground waste glass, granite dust, or other solid waste materials. A system for providing shape and/or surface features to a moldable material includes, in an exemplary embodiment, at least two first opposed flat endless belts spaced apart a first distance, with each having an inner surface and an outer surface.

44 Claims, 6 Drawing Sheets

U.S. PATENT DOCUMENTS

| | | |
|---|---|---|
| 3,738,895 A | 6/1973 | Paymal |
| 3,764,247 A | 10/1973 | Garrett et al. |
| 3,768,937 A | 10/1973 | Haga et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,841,390 A | 10/1974 | DiBenedetto et al. |
| 3,843,757 A * | 10/1974 | Ehrenfreund et al. .......... 264/53 |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,774 A | 11/1975 | Sagane et al. |
| 3,928,258 A | 12/1975 | Alexander |
| 3,963,679 A * | 6/1976 | Ullrich et al. ................... 528/45 |
| 3,981,654 A | 9/1976 | Rood et al. |
| 3,991,005 A | 11/1976 | Wallace |
| 3,999,230 A | 12/1976 | Bruning et al. |
| 4,005,035 A | 1/1977 | Deaver |
| 4,042,314 A | 8/1977 | Bruning et al. |
| 4,060,579 A | 11/1977 | Schmitzer et al. |
| 4,065,410 A | 12/1977 | Schäfer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A * | 12/1978 | Kemerer et al. ............. 425/113 |
| 4,137,200 A | 1/1979 | Wood et al. |
| 4,141,862 A | 2/1979 | Raden et al. |
| 4,143,759 A | 3/1979 | Paradis |
| 4,149,840 A | 4/1979 | Tippmann |
| 4,153,768 A | 5/1979 | Blount |
| 4,160,749 A | 7/1979 | Schneider et al. |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,180,538 A | 12/1979 | Morikawa et al. |
| 4,210,572 A | 7/1980 | Herman et al. |
| 4,214,864 A | 7/1980 | Tabler |
| 4,221,877 A | 9/1980 | Cuscurida et al. |
| 4,243,755 A | 1/1981 | Marx et al. |
| 4,247,656 A | 1/1981 | Janssen |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Müller et al. |
| 4,256,846 A | 3/1981 | Ohashi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulber, Jr. |
| 4,290,248 A | 9/1981 | Kemerer et al. |
| 4,300,776 A | 11/1981 | Taubenmann |
| 4,330,494 A | 5/1982 | Iwata et al. |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,439,548 A | 3/1984 | Weisman |
| 4,450,133 A | 5/1984 | Cafarelli |
| 4,460,737 A | 7/1984 | Evans et al. |
| 4,483,727 A | 11/1984 | Eickman et al. |
| 4,489,023 A | 12/1984 | Proksa |
| 4,512,942 A | 4/1985 | Babbin et al. |
| 4,514,162 A * | 4/1985 | Schulz ................... 425/174.8 R |
| 4,532,098 A | 7/1985 | Campbell et al. |
| 4,540,357 A | 9/1985 | Campbell et al. |
| 4,568,702 A | 2/1986 | Mascioli |
| 4,576,718 A | 3/1986 | Reischl et al. |
| 4,581,186 A * | 4/1986 | Larson ........................ 264/45.8 |
| 4,595,709 A | 6/1986 | Reischl |
| 4,597,927 A | 7/1986 | Zeitler et al. |
| 4,600,311 A | 7/1986 | Mourrier |
| 4,604,410 A | 8/1986 | Altenberg |
| 4,649,162 A | 3/1987 | Roche et al. |
| 4,661,533 A | 4/1987 | Stobby |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,944 A | 5/1989 | Hoefer et al. |
| 4,832,183 A | 5/1989 | Lapeyre |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,051,222 A | 9/1991 | Marten et al. |
| 5,053,274 A | 10/1991 | Jonas |
| 5,091,436 A | 2/1992 | Frisch et al. |
| 5,094,798 A * | 3/1992 | Hewitt ........................... 264/511 |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,149,722 A | 9/1992 | Soukup |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,229,138 A | 7/1993 | Carotti |
| 5,252,697 A | 10/1993 | Jacobs et al. |
| 5,271,699 A | 12/1993 | Barre et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,453,231 A | 9/1995 | Douglas |
| 5,455,312 A | 10/1995 | Heidingsfeld et al. |
| 5,458,477 A | 10/1995 | Kemerer et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,522,446 A | 6/1996 | Mullet et al. |
| 5,527,172 A | 6/1996 | Graham, Jr. |

| | | | | | | |
|---|---|---|---|---|---|---|
| 5,532,065 | A | 7/1996 | Gübitz et al. | 6,409,949 | B1 | 6/2002 | Tanaka et al. |
| 5,536,781 | A | 7/1996 | Heidingsfeld et al. | 6,429,257 | B1 | 8/2002 | Buxton et al. |
| 5,554,713 | A | 9/1996 | Freeland | 6,432,335 | B1 | 8/2002 | Ladang et al. |
| 5,562,141 | A | 10/1996 | Mullet et al. | 6,433,032 | B1 | 8/2002 | Hamilton |
| 5,565,497 | A | 10/1996 | Godbey et al. | 6,433,121 | B1 | 8/2002 | Petrovic et al. |
| 5,566,740 | A | 10/1996 | Mullet et al. | 6,455,605 | B1 | 9/2002 | Giorgini et al. |
| 5,567,791 | A | 10/1996 | Brauer et al. | 6,455,606 | B1 | 9/2002 | Kaku et al. |
| 5,569,713 | A | 10/1996 | Lieberman | 6,458,866 | B1 | 10/2002 | Oppermann et al. |
| 5,582,840 | A | 12/1996 | Pauw et al. | 6,465,569 | B1 | 10/2002 | Kurth |
| 5,582,849 | A | 12/1996 | Lupke | 6,467,610 | B1 | 10/2002 | MacLachlan |
| 5,604,266 | A | 2/1997 | Mushovic | 6,469,667 | B2 | 10/2002 | Fox et al. |
| 5,611,976 | A | 3/1997 | Klier et al. | 6,485,665 | B1 | 11/2002 | Hermanutz et al. |
| 5,621,024 | A | 4/1997 | Eberhardt et al. | 6,534,617 | B1 | 3/2003 | Batt et al. |
| 5,631,103 | A | 5/1997 | Eschbach et al. | 6,541,534 | B2 | 4/2003 | Allen et al. |
| 5,631,319 | A | 5/1997 | Reese et al. | 6,552,660 | B1 | 4/2003 | Lisowski |
| 5,643,516 | A | 7/1997 | Raza et al. | 6,555,199 | B1 | 4/2003 | Jenkines |
| 5,681,915 | A | 10/1997 | Lechner et al. | 6,571,935 | B1 | 6/2003 | Campbell et al. |
| 5,688,890 | A | 11/1997 | Ishiguro et al. | 6,573,309 | B1 | 6/2003 | Reitenbach et al. |
| 5,696,205 | A | 12/1997 | Müller et al. | 6,573,354 | B1 | 6/2003 | Petrovic et al. |
| 5,700,495 | A | 12/1997 | Kemerer et al. | 6,578,619 | B2 | 6/2003 | Wright |
| 5,723,506 | A | 3/1998 | Glorioso et al. | 6,579,932 | B1 | 6/2003 | Schipper et al. |
| 5,728,337 | A | 3/1998 | Yoshikawa et al. | 6,605,343 | B1 | 8/2003 | Motoi et al. |
| 5,759,695 | A | 6/1998 | Primeaux, II | 6,616,886 | B2 | 9/2003 | Peterson et al. |
| 5,760,133 | A | 6/1998 | Heidingsfeld et al. | 6,617,009 | B1 | 9/2003 | Chen et al. |
| 5,782,283 | A | 7/1998 | Kendall | 6,624,244 | B2 | 9/2003 | Kurth |
| 5,783,125 | A | 7/1998 | Bastone et al. | 6,641,384 | B2 | 11/2003 | Bosler et al. |
| 5,783,629 | A | 7/1998 | Srinivasan et al. | 6,649,084 | B2 | 11/2003 | Morikawa et al. |
| 5,795,949 | A | 8/1998 | Daute et al. | 6,649,667 | B2 | 11/2003 | Clatty |
| 5,811,506 | A | 9/1998 | Slagel | 6,686,435 | B1 | 2/2004 | Petrovic et al. |
| 5,817,402 | A | 10/1998 | Miyake et al. | 6,695,902 | B2 | 2/2004 | Hemmings et al. |
| 5,836,499 | A | 11/1998 | Mullet et al. | 6,706,774 | B2 | 3/2004 | Münzenberger et al. |
| 5,844,015 | A | 12/1998 | Steilen et al. | 6,767,399 | B2 | 7/2004 | Peev et al. |
| 5,908,701 | A | 6/1999 | Jennings et al. | 6,769,220 | B2 | 8/2004 | Friesner |
| 5,929,153 | A | 7/1999 | Mori et al. | 6,832,430 | B1 | 12/2004 | Ogawa et al. |
| 5,934,352 | A | 8/1999 | Morgan | 6,849,676 | B1 | 2/2005 | Shibano et al. |
| 5,945,460 | A | 8/1999 | Ekart et al. | 6,864,296 | B2 | 3/2005 | Kurth |
| 5,952,053 | A | 9/1999 | Colby | 6,867,239 | B2 | 3/2005 | Kurth |
| 5,962,144 | A | 10/1999 | Primeaux, II | 6,871,457 | B2 | 3/2005 | Quintero-Flores et al. |
| 5,981,655 | A | 11/1999 | Heidingsfeld et al. | 6,881,763 | B2 | 4/2005 | Kurth |
| 6,000,102 | A | 12/1999 | Lychou | 6,881,764 | B2 | 4/2005 | Doesburg et al. |
| 6,019,269 | A | 2/2000 | Mullet et al. | 6,903,156 | B2 | 6/2005 | Müller et al. |
| 6,020,387 | A | 2/2000 | Downey et al. | 6,908,573 | B2 | 6/2005 | Hossan |
| 6,040,381 | A | 3/2000 | Jennings et al. | 6,916,863 | B2 | 7/2005 | Hemmings et al. |
| 6,051,634 | A | 4/2000 | Laas et al. | 6,962,636 | B2 | 11/2005 | Kurth et al. |
| 6,055,781 | A | 5/2000 | Johanson | 6,971,495 | B2 | 12/2005 | Hedrick et al. |
| 6,062,719 | A | 5/2000 | Busby et al. | 6,979,477 | B2 | 12/2005 | Kurth et al. |
| 6,086,802 | A | 7/2000 | Levera et al. | 6,979,704 | B1 | 12/2005 | Mayer et al. |
| 6,096,401 | A | 8/2000 | Jenkines | 6,989,123 | B1 | 1/2006 | Lee et al. |
| 6,103,340 | A | 8/2000 | Kubo et al. | 6,997,346 | B2 | 2/2006 | Landers et al. |
| 6,107,355 | A | 8/2000 | Horn et al. | 7,063,877 | B2 | 6/2006 | Kurth et al. |
| 6,107,433 | A | 8/2000 | Petrovic et al. | 7,132,459 | B1 | 11/2006 | Buchel |
| 6,120,905 | A | 9/2000 | Flvovsky | 7,160,976 | B2 | 1/2007 | Lühmann et al. |
| 6,136,870 | A | 10/2000 | Triolo et al. | 7,188,992 | B2 | 3/2007 | Mattingly, Jr. |
| 6,140,381 | A | 10/2000 | Rosthauser et al. | 7,196,124 | B2 | 3/2007 | Parker et al. |
| 6,177,232 | B1 | 1/2001 | Melisaris et al. | 7,211,206 | B2 | 5/2007 | Brown et al. |
| 6,180,192 | B1 | 1/2001 | Smith et al. | 7,316,559 | B2 | 1/2008 | Taylor |
| 6,180,686 | B1 | 1/2001 | Kurth | 7,491,351 | B2 | 2/2009 | Taylor et al. |
| RE37,095 | E | * 3/2001 | Glorioso et al. ............ 264/45.3 | 7,651,645 | B2 | 1/2010 | Taylor |
| 6,204,312 | B1 | 3/2001 | Taylor | 7,794,817 | B2 | 9/2010 | Brown |
| 6,211,259 | B1 | 4/2001 | Borden et al. | 2001/0009683 | A1 | 7/2001 | Kitahama et al. |
| 6,224,797 | B1 | 5/2001 | Franzen et al. | 2002/0034598 | A1 | 3/2002 | Bonk et al. |
| 6,234,777 | B1 | 5/2001 | Sperry et al. | 2002/0040071 | A1* | 4/2002 | Lin et al. ............ 521/155 |
| 6,252,031 | B1 | 6/2001 | Tsutsumi et al. | 2002/0045048 | A1 | 4/2002 | Bonk et al. |
| 6,257,643 | B1 | 7/2001 | Young | 2002/0048643 | A1 | 4/2002 | Bonk et al. |
| 6,257,644 | B1 | 7/2001 | Young | 2002/0098362 | A1 | 7/2002 | Mushovic |
| 6,258,310 | B1 | 7/2001 | Sardanopoli et al. | 2002/0171164 | A1 | 11/2002 | Halterbaum et al. |
| 6,258,917 | B1 | 7/2001 | Slagel | 2002/0192456 | A1 | 12/2002 | Mashburn et al. |
| 6,264,462 | B1 | 7/2001 | Gallagher | 2003/0004232 | A1 | 1/2003 | Ruede |
| 6,284,841 | B1 | 9/2001 | Friesner | 2003/0021915 | A1 | 1/2003 | Rohatgi et al. |
| 6,294,637 | B1 | 9/2001 | Braüer et al. | 2003/0083394 | A1 | 5/2003 | Clatty |
| 6,297,321 | B1 | 10/2001 | Onder et al. | 2003/0090016 | A1 | 5/2003 | Petrovic et al. |
| 6,309,507 | B1 | 10/2001 | Morikawa et al. | 2003/0143910 | A1 | 7/2003 | Mashburn et al. |
| 6,312,244 | B1 | 11/2001 | Levera et al. | 2003/0158365 | A1 | 8/2003 | Brauer et al. |
| 6,321,904 | B1 | 11/2001 | Mitchell | 2003/0232933 | A1 | 12/2003 | Lagneaux et al. |
| 6,329,448 | B1 | 12/2001 | Gutsche et al. | 2004/0049002 | A1 | 3/2004 | Andrews et al. |
| 6,343,924 | B1 | 2/2002 | Klepsch | 2004/0121161 | A1 | 6/2004 | Shugert et al. |
| 6,348,514 | B1 | 2/2002 | Calabrese et al. | 2004/0144287 | A1 | 7/2004 | Tardif et al. |
| 6,383,599 | B1 | 5/2002 | Bell et al. | 2004/0198900 | A1 | 10/2004 | Madaj |
| 6,387,504 | B1 | 5/2002 | Mushovic | 2004/0266993 | A1 | 12/2004 | Evans |

| | | | |
|---|---|---|---|
| 2005/0011159 A1 | 1/2005 | Standal et al. |
| 2005/0031578 A1 | 2/2005 | Deslauriers et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0161855 A1 | 7/2005 | Brown et al. |
| 2005/0163969 A1 | 7/2005 | Brown |
| 2005/0171243 A1 | 8/2005 | Hemmings et al. |
| 2005/0182228 A1 | 8/2005 | Kurth |
| 2005/0222303 A1 | 10/2005 | Cernohous |
| 2005/0260351 A1 | 11/2005 | Kurth et al. |
| 2005/0281999 A1 | 12/2005 | Hoffmann et al. |
| 2005/0287238 A1 | 12/2005 | Taylor |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani |
| 2006/0071369 A1 | 4/2006 | Butteriss |
| 2006/0105145 A1 | 5/2006 | Brown |
| 2006/0115625 A1 | 6/2006 | Brown |
| 2006/0186571 A1 | 8/2006 | Brown |
| 2006/0217517 A1 | 9/2006 | Daly |
| 2006/0270747 A1 | 11/2006 | Griggs |
| 2006/0273486 A1 | 12/2006 | Taylor et al. |
| 2007/0027227 A1 | 2/2007 | Shutov |
| 2007/0037953 A1 | 2/2007 | Geiger et al. |
| 2007/0052128 A1 | 3/2007 | Taylor |
| 2007/0066697 A1 | 3/2007 | Gilder et al. |
| 2007/0222105 A1 | 9/2007 | Brown |
| 2007/0222106 A1 | 9/2007 | Brown |
| 2007/0225391 A1 | 9/2007 | Brown |
| 2007/0225419 A1 | 9/2007 | Brown |
| 2008/0029925 A1 | 2/2008 | Brown |
| 2008/0132611 A1 | 6/2008 | Brown |

FOREIGN PATENT DOCUMENTS

| | | |
|---|---|---|
| CN | 1251596 A | 4/2000 |
| CN | 1052991 C | 5/2000 |
| CN | 1926282 A | 3/2007 |
| DE | 2351844 A | 4/1975 |
| GB | 01152306 | 5/1969 |
| GB | 1246940 | 9/1971 |
| GB | 2347933 | 9/2000 |
| JP | 355080456 A | 6/1980 |
| JP | 58-132533 | 8/1983 |
| JP | 63-22819 | 1/1988 |
| JP | 63-202408 | 8/1988 |
| JP | 5-285941 | 11/1993 |
| JP | 7-76395 | 3/1995 |
| JP | 7-313941 | 12/1995 |
| JP | 8-188634 | 7/1996 |
| JP | 11-171960 | 6/1999 |
| JP | 2001-326361 | 11/2001 |
| JP | 2004-131654 | 4/2004 |
| JP | 2005-138567 | 6/2005 |
| KR | 2002086327 A | 11/2002 |
| NZ | 226301 | 3/1990 |
| WO | WO 81/03026 | 10/1981 |
| WO | WO 87/05541 | 9/1987 |
| WO | WO 91/00304 | 1/1991 |
| WO | WO 92/07892 | 5/1992 |
| WO | WO 93/19110 | 9/1993 |
| WO | WO 93/24549 | 12/1993 |
| WO | WO 94/25529 | 11/1994 |
| WO | WO 94/27697 | 12/1994 |
| WO | WO 97/11114 A1 | 3/1997 |
| WO | WO 97/44373 | 11/1997 |
| WO | WO 98/08893 A1 | 5/1998 |
| WO | WO 99/39891 | 8/1999 |
| WO | WO 00/17249 | 3/2000 |
| WO | WO 01/72863 | 10/2001 |
| WO | WO 02/01530 | 1/2002 |
| WO | WO 2004/078900 | 9/2004 |
| WO | WO 2004/113248 A2 | 12/2004 |
| WO | WO 2005/053938 | 6/2005 |
| WO | WO 2005/056267 | 6/2005 |
| WO | WO 2005/072187 A2 | 8/2005 |
| WO | WO 2005/072187 A3 | 8/2005 |
| WO | WO 2005/072188 A2 | 8/2005 |
| WO | WO 2005/072188 A3 | 8/2005 |
| WO | WO 2005/094255 | 10/2005 |
| WO | WO 2005/123798 A1 | 12/2005 |
| WO | WO 2006/012149 | 6/2006 |
| WO | WO 2006/137672 A1 | 12/2006 |
| WO | WO 2007/112104 | 10/2007 |
| WO | WO 2007/112105 | 10/2007 |

OTHER PUBLICATIONS

Office Action Issued in U.S. Appl. No. 11/691,451 on Jun. 27, 2008.
Office Action Issued in U.S. Appl. No. 10/764,012 on Jan. 7, 2008.
Tenibac-Graphion, Inc., Texturing Technologists, Brochure, Oct. 1, 1997.
Bayer AG, Bayferrox Iron Oxide Pigments: Manufacturing, Properties and Application Recommendations.
Krishnamurthi, B, et al.., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.
Nosker, Thomas J., et al., Fiber Orientation and Creation of Structural Plastic Lumber, Plastics Engineering, Jun. 1999, pp. 53-56.
Bledzki, Andrzej K., et al., Impact Properties of Natural Fiber-Reinforced Epoxy Foams, Journal of Cellular Plastics, vol. 35, Nov. 1999, pp. 550-562.
Frisch, K.C., et al., Hybrid IPN-Foam Composites, Cellular Polymers, Papers from a Three-day International Conference organized by Rapra Technology Limited, Mar. 20-22, 1991.
Shutov, F.A., Excerpts from Integral/Structural Polymer Foams: Technology, Properties and Applications, 1986, Pages including preface, 3-4, 8-9, 13, 23-25, 131-134, 153-158, 167, 171, 176-179, 256.
Klempner, D., ed., et al., Excerpts from Handbook of Polymeric Foams and Foam Technology, 2d ed., 2004, pp. 121-124, 126, 128, 129, Hanser Publishers, Munich.
Randall, D., ed., et. al., Excerpts from "The polyurethanes book", 2002, pp. 1, 166-167, 210-213, 229-231, 263-264, Dunholm Publicity Ltd., United Kingdom.
Woods, G., Excerpts from "The ICI Polyurethanes Book", 1987, pp. 119-120, 127, 135-140, 158-159, The Netherlands.
Wypych, G., Excerpts from "Fillers", 1993, pp. 4, 48, 57, ChemTech Publishing, Ontario Canada.
Elias, H., Excerpts from "An Introduction to Polymer Science", 1997, pp. 408-409, VCH Publishers, Inc., New York, NY.
Chawla, K. K., Excerpts from "Composite Materials: Science and Engineering", 1987, pp. 89-92, Spring Verlag, New York, NY.
OSi Specialties, "Fomrez Tin Catalysts", 3 pages.
National Center for Environmental Research and Quality Assurance, Office of Research and Development, U.S. Environmental Protection Agency, Abstract of "The Use of Multi-Component Waste Products for Use in Roofing Materials," May 9, 1998.
Energy Efficient Building Products from Waste Materials, Development and Demonstration Project, Proposal, Sep. 10, 1999, NYS Energy Research & Development Authority.
Foamed Recyclables: New Process Efficiently Transforms Solid Waste into Synthetic Building Materials, Jan. 2002, United States Department of Energy, Office of Industrial Technologies, Inventions and Innovations Program.
"PVC Double Wall Corrugated Pipe Manufacturing Plant", Korea Association of Machinery Industry.
"Achieving a Wood Grain Finish Effect," dated Dec. 11, 2003, http://www.sculpt.com/technogtes/woodgrainfinish.htm.
Bayer Material Science, Product Index—Polyurethane Raw Materials Prepolymers and Systems (2006).
Bayer Material Science, Multranol 4035—Polyether Polyol, CAS No. 9049-71-2, Product Code: K114 (1997).
Bayer Material Science, Arcol LG-56—Polyether Polyol, CAS No. 25791-96-2, Product Code: KLLG56 (2003).
Bayer Material Science, Multranol 3900—Polyether Polyol (2006).
Urethane Soy Systems Company, Material Safety Data Sheet, SoyTherm 50 A-side, pp. 1-8.
Urethane Soy Systems Company, Material Safety Data Sheet, SoyTherm 50 B-side, pp. 1-8.

Guo et al., "Rigid Urethane Foams from a Soy Polyol-Dod Hybrid," USDA Agricultural Research Service, http://ars.usda.gov/research/publications/publications.htm?SEQ_NO_115=145249 (May 9, 2003).

Guo et al., "Polyols and Polyurethanes from Hydroformylation of Soybean Oil," Journal of Polymers and the Environment 10(1-2):49-52 (Apr. 2002).

Pollack, "Soy vs. Petro Polyols A Life-Cycle Comparison," Omni Tech International, Ltd. (date unknown).

Petrovic et al., "Industrial Oil Products Program," AOCS Archives, (2007).

Soyol Polyols and Systems Product Descriptions (available at www.soyol.com).

Office Action issued in U.S. Appl. No. 10/764,012 on Nov. 15, 2005.
Office Action issued in U.S. Appl. No. 10/764,012 on May 31, 2006.
Office Action issued in U.S. Appl. No. 10/764,012 on Jul. 31, 2007.
Supplemental Information Disclosure Statement filed in U.S. Appl. No. 10/764,012 on Apr. 19, 2007.

Deposition of Thomas E. Jurgensen, pp. 1-407 (Jan. 9, 2006)—Redacted.
Deposition of Daniel Klempner, pp. 1-120 (Jan. 6, 2006)—Redacted.
Summary of Opinions, Daniel Klempner, pp. 1-11 (Jan. 4, 2006).
Deposition of John R Taylor, pp. 1-388 (Dec. 7, 2005)—Redacted.
Deposition of Fyodor Shutov vol. 1, pp. 1-312 (Dec. 15, 2005)—Redacted.
Deposition of Fyodor Shutov vol. 2, pp. 1-182 (Dec. 28, 2005)—Redacted.
Deposition of Wade Brown vol. 1, pp. 1-212 (Nov. 17, 2005)—Redacted.
Deposition of Wade Brown vol. 2, pp. 1-256 (Nov. 18, 2005)—Redacted.
Deposition of Wade Brown vol. 3, pp. 1-302 (Nov. 21, 2005)—Redacted.
Deposition of Edward J. Butteriss vol. 1, pp. 1-501 (Dec. 16, 2005).
Deposition of Edward J. Butteriss vol. 2, pp. 1-195 (Dec. 28, 2005).
Deposition of Zachary R. Taylor vol. 1, pp. 1-221 (Dec. 29, 2005)—Redacted.
Deposition of Zachary R. Taylor vol. 2, pp. 1-285 (Jan. 5, 2006)—Redacted.

International Search Report issued in International Application No. PCT/US2007/007468 on Nov. 19, 2007.
International Search Report issued in International Application No. PCT/US2007/007470 on Nov. 19, 2007.

Past, present, and future office actions, amendments, arguments, and other relevant documents or materials in the file history of co-pending U.S. Appl. No. 10/764,012, filed Jan. 23, 2004, entitled Filled Polymer Composite and Synthetic Building Material Compositions.

Past, present, and future office actions, amendments, arguments, and other relevant documents or materials in the file history of co-pending U.S. Appl. No. 11/407,416, filed Apr. 20, 2006, entitled Filled Polymer Composite and Synthetic Building Material Compositions.

Past, present, and future office actions, amendments, arguments, and other relevant documents or materials in the file history of co-pending U.S. Appl. No. 11/841,901, filed Aug. 20, 2007, entitled Filled Polymer Composite and Synthetic Building Material Compostions.

Past, present, and future office actions, amendments, arguments, and other relevant documents or materials in the file history of co-pending U.S. Appl. No. 11/317,494, filed Dec. 22, 2005, entitled Filled Polymer Composite and Synthetic Building Material Compositions.

Past, present, and future office actions, amendments, arguments, and other relevant documents or materials in the file history of co-pending U.S. Appl. No. 11/317,958, filed Dec. 22, 2005, entitled Filled Polymer Composite and Synthetic Building Material Compositions.

Past, present, and future office actions, amendments, arguments, and other relevant documents or materials in the file history of co-pending U.S. Appl. No. 12/361,488, filed Jan. 28, 2009, entitled Continuous Forming System Utilizing Up to Six Endless Belts.

Past, present, and future office actions, amendments, arguments, and other relevant documents or materials in the file history of co-pending U.S. Appl. No. 11/593,316, filed Nov. 6, 2006, entitled Method for Molding Three-Dimensional Foam Products Using a Continuous Forming Apparatus.

Past, present, and future office actions, amendments, arguments, and other relevant documents or materials in the file history of co-pending U.S. Appl. No. 11/691,438, filed Mar. 26, 2007, entitled Polyurethane Composite Materials.

Past, present, and future office actions, amendments, arguments, and other relevant documents or materials in the file history of co-pending U.S. Appl. No. 11/691,449, filed Mar. 26, 2007, entitled Polyurethane Composite Materials.

Past, present, and future office actions, amendments, arguments, and other relevant documents or materials in the file history of co-pending U.S. Appl. No. 11/691,451, filed Mar. 26, 2007, entitled Polyurethane Composite Materials.

Past, present, and future office actions, amendments, arguments, and other relevant documents or materials in the file history of co-pending U.S. Appl. No. 11/691,446, filed Mar. 26, 2007, entitled Extrusion of Polyurethane Composite Materials.

Past, present, and future office actions, amendments, arguments, and other relevant documents or materials in the file history of co-pending U.S. Appl. No. 11/691,456, filed Mar. 26, 2007, entitled Extrusion of Polyurethane Composite Materials.

Jan. 22, 2009 European Supplemental Search Report Appln No. 05711595.8-2115/1716283 PCT/US2005001570.
Jan. 25, 2006 International Search Report for PCT/US05/01570 filing date Jan. 21, 2005.
Oct. 6, 2008 Office Action in U.S. Appl. No. 11/317,958 on Dec. 22, 2005.
Nov. 7, 2008 Office Action in U.S. Appl. No. 11/407,416 on Apr. 20, 2006.
Jan. 13, 2009 Office Action in U.S. Appl. No. 10/761,012 on Jan. 23, 2004.

Co-Pending U.S. Appl. No. 11/417,385, filed May 4, 2006, titled Continuous Forming System Utilizing Up to Six Endless Belts, and assigned to the assignee of this application.

Co-pending U.S. Appl. No. 11/593,316, filed Nov. 6, 2006, titled Method for Molding Three-Dimensional Foam Products Using a Continuous Forming Apparatus, and assigned to the assignee of this application.

Office Action issued in U.S. Appl. No. 10/764,013, on Dec. 5, 2005.
Office Action issued in U.S. Appl. No. 10/764,013, on Jun. 7, 2006.
Supplemental Information Disclosure Statement filed in U.S. Appl. No. 11/165,071, on Apr. 19, 2007.

Certel, G. Editor: Polyurethane Handbook $2^{nd}$ Edition: 1994: pp. 136-137, 182-183, 252-253; Cark Hanser Verlag, Munich.

Cleated Belt Puller, http://www.esi-extrusion.com/cbpuller,htm, Aug. 5, 2002.

Custom Downstream Systems, Excerpts from Catalog, 6 pages including cover page.

McMaster-Carr, Excerpts from Catalog, pp. 1052-1053.

RDN Manufacturing Co., Inc., 140, 148 & 160 Belt Pullers, http://www.rdnmfg.com/products/pull140_160.htm, Aug. 5, 2002.

Feb. 24, 2009 European Search Report for EP Patent Appln. 05762651.7.

Winkler, Non-Final Rejection of U.S. Appl. No. 11/691,449, Jun. 30, 2008.

Winkler, Non-Final Rejection of U.S. Appl. No. 11/691,451, Jun. 27, 2008.

Chevalier, Non-Final Rejection of U.S. Appl. No. 11/317,494, Mar. 26, 2009.

* cited by examiner

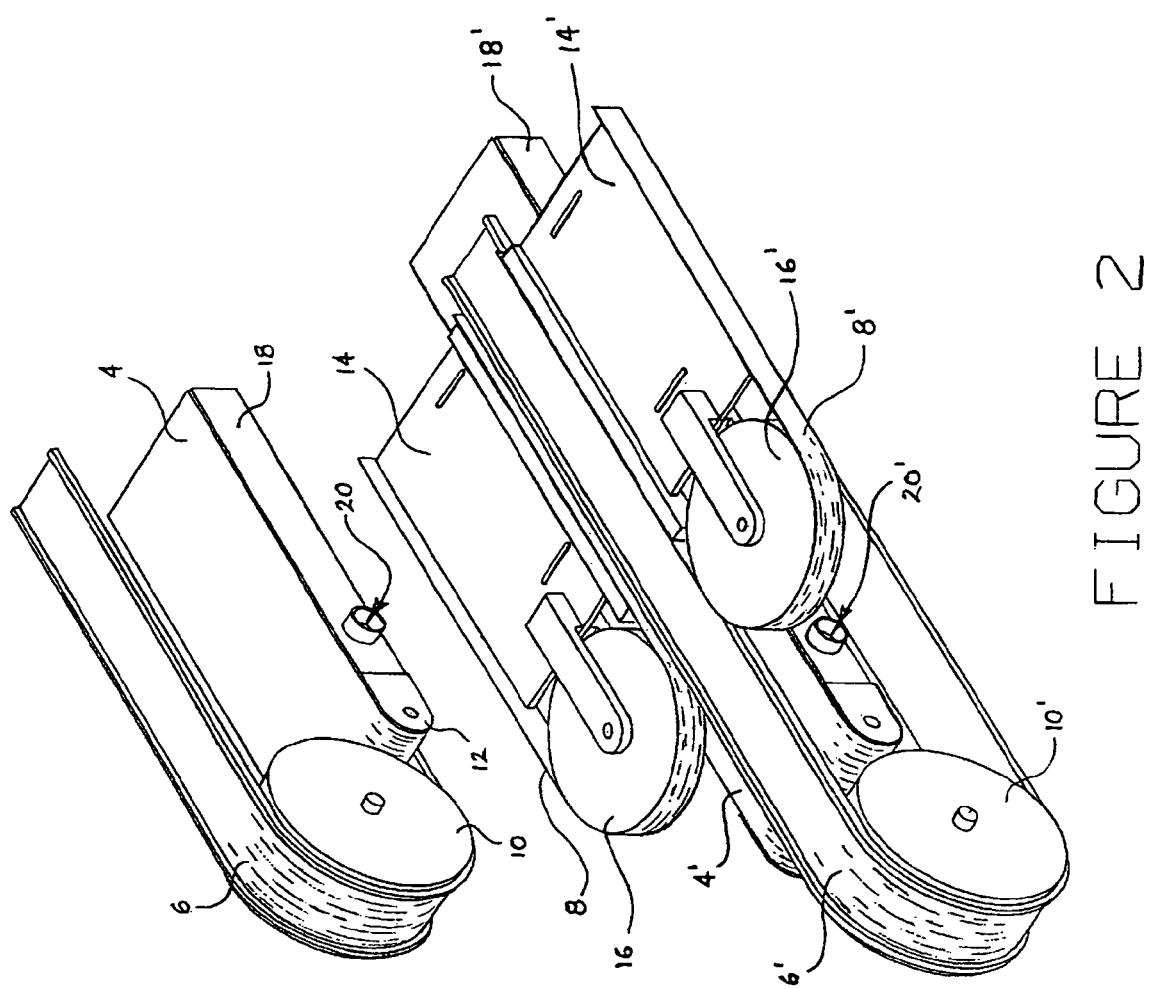

FILLED POLYMER COMPOSITE AND SYNTHETIC BUILDING MATERIAL COMPOSITIONS

CROSS-REFERENCE TO RELATED APPLICATIONS

This application is a continuation of U.S. patent application Ser. No. 10/764,012, filed Jan. 23, 2004, now U.S. Pat. No. 7,763,341 currently pending, which is hereby incorporated by reference in its entirety.

BACKGROUND OF THE INVENTION

1. Field of the Invention

The invention relates to composite compositions having matrices of polymer networks and dispersed phases of particulate and/or fibrous materials, which have excellent mechanical properties, rendering them suitable for use in load bearing applications, such as in building materials. The composites are stable to weathering, can be molded and colored to desired functional and aesthetic characteristics, and are environmentally friendly, since they can make use of recycled particulate or fibrous materials as the dispersed phase. The invention relates to methods and systems for imparting desired shape and surface characteristics to a moldable or pliable material as the material cures or hardens. It is particularly applicable to the shaping and embossing of thermosetting resin systems during curing, and can be used to form these resin systems into a variety of products, including synthetic lumber, roofing, and siding.

2. Description of the Related Art

Polymeric composite materials that contain organic or inorganic filler materials have become desirable for a variety of uses because of their excellent mechanical properties, weathering stability, and environmental friendliness.

These materials can be are relatively low density, due to their foaming, or high density when unfoamed, but are extremely strong, due to the reinforcing particles or fibers used throughout. Their polymer content also gives them good toughness (i.e., resistance to brittle fracture), and good resistance to degradation from weathering when they are exposed to the environment. This combination of properties renders some polymeric composite materials very desirable for use in building materials, such as roofing materials, decorative or architectural products, outdoor products, insulation panels, and the like.

In addition, the filler materials used need not be virgin materials, and can desirably be recycled fibers or particulates formed as waste or by-product from industrial processes. Polymeric composites allow these materials to be advantageously reused, rather than present disposal problems.

Filled composite polymeric materials have been described in U.S. Pat. Nos. 5,302,634; 5,369,147; 5,548,315; and 5,604,260, the contents of each of which is incorporated herein by reference. However, the materials disclosed in these patents all use polyester polyurethane resins that are formed as the reaction products of unsaturated polyester polyols, saturated polyols, poly- or di-isocyanates, and a reactive monomer, such as styrene. The number of different reactants, and the complexity of the resulting process chemistry, adds increased cost to the preparation of these materials, both through added costs for materials inputs and through added capital costs for additional process equipment.

A filled closed cell foam material is disclosed in U.S. Pat. No. 4,661,533 (Stobby), but provides much lower densities than are desirable for structural building products. Moreover, Stobby does not disclose or suggest a composite material that is "self-skinning," i.e., that forms a continuous skin on the surface of the material that covers and protects the material underneath, which is porous, and subject to visible scratching.

Various techniques exist for continuously forming a soft or moldable material while it hardens or cures. For example, conveyor belts can be used to provide continuous support and movement for materials, and in some cases the belt faces may be contoured or profiled to mold the surfaces of the material and to impart a shape, feature, or surface appearance to the material. Two or more such belts may be configured to operate with the belt surfaces opposed and the material to be molded or shaped disposed between them. These systems can form fairly detailed three-dimensional products.

However, when such systems are used to form a foamed product, the structure of the overall system must be sufficiently strong to contain the pressure of the expanding foam. The longer the forming system and the larger the cross-section of the product to be formed, the greater the total force due to pressure and friction that the system must contain and overcome. As a result, in general, belt systems have not been thought to be suitable for formation of resin systems that involve foaming of the polymer matrix.

Forming systems have been developed to produce large rectangular polyurethane foam buns; these systems typically contain the foaming material within roller-supported films or sheets. The many rollers used in these systems contain the increase in pressure due to foaming, and also help to minimize system friction. However, these systems are generally not able to mold detail or texture into the product surface.

Pullers are two-belted machines designed to grip and pull an extruded profile. As indicated above, conventional two-belt systems, such as pullers that utilize thick profiled belts, may be configured to continuously mold detail and texture into a product. However, these forming systems typically require profiled belts with relatively thick sidewall cross sections. The thick sidewalls minimize deflection of the unsupported sides of the mold-belt, thereby maintaining the intended product shape, and limiting extrusion of material through the resultant gap between belts. The thickness of the product formed by a conventional two-belt system is thus limited in practice by the thickness and width of the profiled mold-belts. Thicker belts needed to form products with deeper profiles require larger diameter end pulleys in order to prevent excessive bending, stretching, and premature breakage of the mold material.

In addition, most pullers are relatively short (6 feet or less). These short forming systems tend to require slower production speeds, allowing the product enough time in-mold to harden sufficiently before exiting the forming unit. Longer two-belt machines can be made, but in order to manage belt/bed friction these longer systems typically require the use of rollers to support the back of the profiled belts. Roller supported mold-belts tend to allow the mold faces to separate between rollers where the belts are unsupported, allowing material to leak between belt faces.

To continuously mold larger foamed cross-sections and to impart irregular shape or surface detail to the product, table-top conveyors are frequently used. Table-top conveyors use segmented metal mold sections attached to a metal chain-type conveyor. Two table-top conveyors are typically arranged face-to-face when used in this type of application, providing a rigid continuous mold. Preventing material from migrating into the joints between adjacent mold sections can be problematic for this type of forming system and may required the use of plastic films disposed between the mold and material to prevent leaks. In addition, such table-top conveyor systems are complex and costly.

Because of the various difficulties and deficiencies described above for existing forming systems, there remains a need in the art for a low cost forming system that can shape a curing polymer system, and in particular a foaming polymer system, without leaking. There is a need for such a system that can impart surface patterns and designs to the curing material, and that has sufficiently low friction and thickness that it can be practically made long enough to allow sufficient curing time in the system.

SUMMARY OF THE INVENTION

It has been found, however, that a highly filled, foamed or unfoamed composite polymeric material having good mechanical properties can be obtained without the need for all of the components required in the patents cited above. This results in a substantial decrease in cost, because of decreased materials cost, and because of decreased complexity of the process chemistry, leading to decreased capital investment in process equipment.

In one embodiment, the invention relates to composite compositions having a matrix of polymer networks and dispersed phases of particulate or fibrous materials. The polymer matrix contains a polyurethane network formed by the reaction of a poly- or di-isocyanate and one or more saturated polyether or polyester polyols, and an optional polyisocyanurate network formed by the reaction of optionally added water and isocyanate. The matrix is filled with a particulate phase, which can be selected from one or more of a variety of components, such as fly ash particles, axially oriented fibers, fabrics, chopped random fibers, mineral fibers, ground waste glass, granite dust, or other solid waste materials. The addition of water can also serve to provide a blowing agent to the reaction mixture, resulting in a foamed structure, if such is desired.

The composite material of the invention is advantageously used as structural building material, and in particular as synthetic lumber, for several reasons. First, it has the desired density, even when foamed, to provide structural stability and strength. Second, the composition of the material can be easily tuned to modify its properties by, e.g., adding oriented fibers to increase flexural stiffness, or by adding pigment or dyes to hide the effects of scratches. This can be done even after the material has been extruded. Third, the material is self-skinning, forming a tough, slightly porous layer that covers and protects the more porous material beneath. This tough, continuous, highly adherent skin provides excellent water and scratch resistance. In addition, as the skin is forming, an ornamental pattern (e.g., a simulated wood grain) can be impressed on it, increasing the commercial acceptability of products made from the composite.

In a more specific embodiment, the invention relates to a polymer matrix composite material, comprising:
(1) a polyurethane formed by reaction of
  (a) one or more monomeric or oligomeric poly- or di-isocyanates;
  (b) a first polyether polyol having a first molecular weight; and
  (c) an optional second polyether polyol having a second molecular weight lower than the first molecular weight; and
(2) optionally, a polyisocyanurate formed by reaction of a monomeric or oligomeric poly- or di-isocyanate with water or other blowing agents;
(3) a particulate inorganic filler.

As indicated above, the polymer matrix composite material of the invention can have a variety of different uses. However, it is particularly suitable in structural applications, and in particular as an synthetic lumber. Accordingly, another specific embodiment of the invention relates to an synthetic lumber, comprising the polymer matrix composite material described above, and having a relatively porous material and a relatively non-porous toughening layer disposed on and adhered to the porous material.

It has been found that the process used to manufacture the polymer matrix composite material and the synthetic lumber formed therefrom can have an important impact on the appearance and properties of the resulting material, and thus on its commercial acceptability. Accordingly, another particular embodiment of the invention relates to a method of producing a polymer matrix composite, by:
(1) mixing a first polyether polyol having a first molecular weight and a second polyether polyol having a second molecular weight higher than the first molecular weight with a catalyst, optional water, and optional surfactant;
(2) optionally introducing reinforcing fibrous materials into the mixture;
(3) introducing inorganic filler into the mixture;
(4) introducing poly- or di-isocyanate into the mixture; and
(5) allowing the exothermic reaction to proceed without forced cooling except to control runaway exotherm.

The materials of the invention, and the process for their preparation, are environmentally friendly. They provide a mechanism for reuse of particulate waste in a higher valued use, as described above. In addition, the process for making them optionally uses water in the formation of polyisocyanurate, which releases carbon dioxide as the blowing agent. The process thus avoids the use of environmentally harmful blowing agents, such as halogenated hydrocarbons.

The invention disclosed in this application is a new type of forming system utilizing up to six belts. The forming system is uniquely suited to the continuous forming of a range of product sizes with intricate molded-in detail. Material that may be formed using the described system include but are not limited to: thermoplastic and thermoset plastic compounds, highly-filled plastic compounds, elastomers, ceramic materials, and cementitious materials. The system is particularly suited to the forming of foamed materials. The material to be formed may be poured, dropped, extruded, spread, or sprayed onto or into the forming system.

In one embodiment, the invention relates to a system for providing shape, surface features, or both, to a moldable material, the system having:
  at least two first opposed flat endless belts disposed a first distance apart from each other, each having an inner surface and an outer surface;
  at least two second opposed flat endless belts disposed substantially orthogonal to the first two opposed endless belts and a second distance apart from each other, and each having an inner surface and an outer surface;
  a mold cavity defined at least in part by the inner surfaces of at least two of the opposed flat endless belts; and
  a drive mechanism for imparting motion to at least two of the opposed flat endless belts.

In a more particular embodiment, the invention relates to a forming system having 4 flat belted conveyors configured so as to define and enclose the top, bottom, and sides of a 4-sided, open-ended channel, and an additional two profiled mold-belts that are configured to fit snugly, face-to-face within the channel provided by the surrounding flat belts. All belts are endless and supported by pulleys at the ends of their respective beds so as to allow each belt to travel continuously about its fixed path.

In another embodiment, the invention relates to a method of continuously forming a moldable material to have a desired shape or surface feature or both, comprising:
  introducing the moldable material into an end of a mold cavity formed at least in part by the inner surfaces of two substantially orthogonal sets of opposed flat belts;
  exerting pressure on the moldable material through the opposed flat belts;
  transferring the moldable material along the mold cavity by longitudinal movement of the belts;
  after sufficient time for the material to cure or harden into the molded configuration and thereby form molded material, removing the molded material from the mold cavity.

The system and method are versatile, permitting the production of a range of product sizes and profiles using the same machine. In an exemplary embodiment, the system and method provide for the continuous forming of synthetic lumber, roofing tiles, molded trim profiles, siding or other building products from heavily-filled, foamed thermoset plastic compounds and/or foamed ceramic compounds with organic binders.

BRIEF DESCRIPTION OF THE DRAWINGS

FIG. 2 is a partially expanded isometric view of one end of the system illustrated in FIG. 1.

DETAILED DESCRIPTION OF THE PREFERRED EMBODIMENT

Figure 1A:
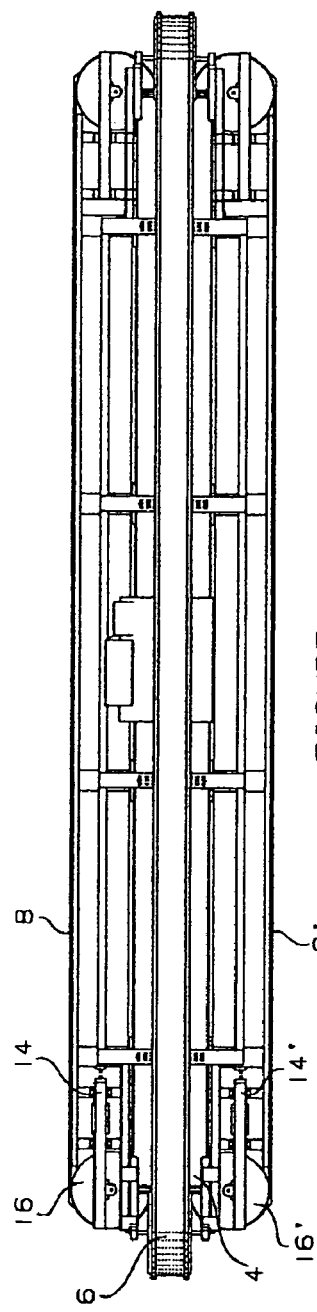
FIG. 1A is a top plan view.

As described above, one embodiment of the invention relates to a composite composition containing a polymeric matrix phase and a dispersed inorganic particulate phase, and which can contain other materials, such as reinforcing fibers, pigments and dyes, and the like. One of the desirable properties of the material is its self-skinning nature.

The polymeric phase desirably contains at least a polyurethane, generally considered to be a 2-part or thermosetting polyurethane. The polyurethane is formed by reacting a poly- or di-isocyanate (hereinafter "isocyanate"), particularly an aromatic diisocyanate, more particularly, a methylene diphenyl diisocyanate (MDI), with one or more polyether polyols, described in more detail below.

The MDI used in the invention can be MDI monomer, MDI oligomer, or a mixture thereof The particular MDI used can be selected based on the desired overall properties, such as the amount of foaming, strength of bonding to the inorganic particulates, wetting of the inorganic particulates in the reaction mixture, strength of the resulting composite material, and stiffness (elastic modulus). Although toluene diisocyanate can be used, MDI is generally preferable due to its lower volatility and lower toxicity. Other factors that influence the particular MDI or MDI mixture used in the invention are viscosity (a low viscosity is desirable from an ease of handling standpoint), cost, volatility, reactivity, and content of 2,4 isomer. Color may be a significant factor for some applications, but does not generally affect selection of an MDI for preparing synthetic lumber.

Light stability is also not a particular concern for selecting MDI for use in the composite of the invention. In fact, the composite of the invention allows the use of isocyanate mixtures not generally regarded as suitable for outdoor use, because of their limited light stability. When used in the composite of the invention, these materials surprisingly exhibit excellent light stability, with little or no yellowing or chalking. Since isocyanate mixtures normally regarded as suitable for outdoor use (generally aliphatic isocyanates) are considerably more expensive than those used in this invention, the ability of the invention to use MDI mixtures represents a significant cost advantage.

Suitable MDI compositions for use in the invention include those having viscosities ranging from about 25 to about 200 cp at 25° C. and NCO contents ranging from about 30% to about 35%. Generally, isocyanates are used that provide at least 1 equivalent NCO group to 1 equivalent OH group from the polyols, desirably with about 5% to about 10% excess NCO groups. Suitable isocyanates include Bayer MRS-4, Bayer MR Light, Dow PAPI 27, Bayer MR5, Bayer MRS-2, and Rubinate 9415.

As indicated above, the isocyanate used in the invention is reacted with one or more polyols. In general, the ratio of isocyanate to polyol, based on equivalent weights (OH groups for polyols and NCO groups for isocyanates) is generally in the range of about 0.5:1 to about 1.5:1, more particularly from about 0.8:1 to about 1.1:1. Ratios in these ranges provide good foaming and bonding to inorganic particulates, and yields low water pickup, fiber bonding, heat distortion resistance, and creep resistance properties. However, precise selection of the desired ratio will be affected by the amount of water in the system, including water added per se as a foaming agent, and water introduced with other components as an "impurity."

The polyol or polyols used may be single monomers, oligomers, or blends. Mixtures of polyols can be used to influence or control the properties of the resulting polymer network. For example, mixtures of two polyols, one a low molecular weight, rigid (relative to the second) polyol and the other a higher molecular weight, more rubbery (relative to the first) polyol. The amount of rigid polyol is carefully controlled in order to avoid making the composite too brittle. An amount of flexible polyol of between about 5 wt % and about 20 wt %, more particularly around 15 wt %, based on the total weight of the flexible and rigid polyols being 100 wt %, has generally been found to be suitable. It is generally desirable to use polyols in liquid form, and generally in the lowest viscosity liquid form available, as these can be more easily mixed with the inorganic particulate material. So-called "EO" tipped polyols can be used; however their use is generally avoided where it is desired to avoid "frosting" of the polymer material when exposed to water.

In general, desirable polyols include polyether polyols, such as MULTRANOL (Bayer), including MULTRANOL 3400 or MULTRANOL 4035, ethylene glycol, diethylene glycol, triethylene glycol, dipropylene glycol, glycerol, 2-butyn-1,4-diol, neopentyl glycol, 1,2-propanediol, pentaerythritol, mannitol, 1,6-hexanediol, 1,3-buytylene glycol, hydrogenated bisphenol A, polytetramethyleneglycolethers, polythioethers, and other di- and multi-functional polyethers and polyester polyethers, and mixtures thereof. The polyols need not be miscible, but should not cause compatibility problems in the polymeric composite.

As indicated above, the composite of the invention can desirably be prepared by mixing the polyols together (if multiple polyols are used), and then mixing them with various additives, such as catalysts, surfactants, and foaming agent, and then adding the inorganic particulate phase, then any reinforcing fiber, and finally the isocyanate.

One or more catalysts are generally added to control the curing time of the polymer matrix (upon addition of the isocyanate), and these may be selected from among those known to initiate reaction between isocyanates and polyols, such as amine-containing catalysts, such as DABCO and tetramethylbutanediamine, tin-, mercury- and bismuth-containing catalysts. To increase uniformity and rapidity of cure, it may be desirable to add multiple catalysts, including a catalyst that provides overall curing via gelation, and another that provides rapid surface curing to form a skin and eliminate tackiness. For example, a liquid mixture of 1 part tin-containing catalyst to 10 parts amine-containing catalyst can be added in an amount greater than 0 wt % and below about 0.10 wt % (based on the total reaction mixture) or less, depending on the length of curing time desired. Too much catalyst can result in overcuring, which could cause buildup of cured material on the processing equipment, or too stiff a material which cannot be properly shaped, or scorching; in severe cases, this can lead to unsaleable product or fire. Curing times generally range from about 5 seconds to about 2 hours.

A surfactant may optionally be added to the polyol mixture to function as a wetting agent and assist in mixing of the inorganic particulate material. The surfactant also stabilizes bubbles formed during foaming (if a foamed product is desired) and passivates the surface of the inorganic particulates, so that the polymeric matrix covers and bonds to a higher surface area. Surfactants can be used in amounts below about 0.5 wt %, desirably about 0.3 wt %, based on the total weight of the mixture. Excess amount of surfactant can lead to excess water absorption, which can lead to freeze/thaw damage to the composite material. Silicone surfactants have been found to be suitable for use in the invention. Examples include DC-197 and DC-193 (silicone-based, Air Products), and other nonpolar and polar (anionic and cationic) products.

Foaming agent may also be added to the polyol mixture if a foamed product is desired. While these may include organic blowing agents, such as halogenated hydrocarbons, hexanes, and other materials that vaporize when heated by the polyol-isocyanate reaction, it has been found that water is much less expensive, and reacts with isocyanate to yield $CO_2$, which is inert, safe, and need not be scrubbed from the process. Equally as important, $CO_2$ provides the type of polyurethane cells desirable in a foamed product (i.e., mostly open, but some closed cells), is highly compatible with the use of most inorganic particulate fillers, particularly at high filler levels, and is compatible with the use of reinforcing fibers. Other foaming agents will not produce the same foam structure as is obtained with water.

If water is not added to the composition, some foaming may still occur due to the presence of small quantities of water (around 0.2 wt %, based on the total weight of the reaction mixture) introduced with the other components as an "impurity." On the other hand, excessive foaming resulting from the addition of too much water (either directly or through the introduction of "wet" reactants or inorganic particulate materials) can be controlled by addition of an absorbent, such as UOP "T" powder.

The amount of water present in the system will have an important effect on the density of the resulting composite material. This amount generally ranges from about 0.10 wt % to about 0.40 wt %, based on the weight of polyol added, for composite densities ranging from about 20 $lb/ft^3$ to about 90 $lb/ft^3$.

Reinforcing fibers can also be introduced into the polyol mixture prior to introduction of the isocyanate. These can include fibers per se, such as chopped fiberglass, or fabrics or portions of fabrics, such as rovings or linear tows, or combinations of these. Typically, the reinforcing fibers range from about 0.125 in. to about 1 in, more particularly from about 0.25 in to about 0.5 in. The reinforcing fibers give the material added strength (flexural, tensile, and compressive), increase its stiffness, and provide increased toughness (impact strength or resistance to brittle fracture). Fabrics, rovings, or tows increase flexural stiffness and creep resistance. The inclusion of the particular polyurethane networks of the invention, together with the optional surfactants, and the inorganic particulate sizes used make the composite of the invention particularly and surprisingly well suited for inclusion of reinforcing fibers in foamed material, which normally would be expected to rupture or distort the foam bubbles and decrease the strength of the composite system.

In addition to inclusion of reinforcing fibers into the polyol mixture prior to polymerization, oriented axial fibers can also be introduced into the composite after extrusion, as the polymer exits the extruder and prior to any molding. The fibers (e.g., glass strings) can desirably be wetted with a mixture of polyol (typically a higher molecular weight, rigid polyol) and isocyanate, but without catalyst or with a slow cure catalyst, or with other rigid or thermosetting resins, such as epoxies. This allows the wetted fiber to be incorporated into the composite before the newly added materials can cure, and allows this curing to be driven by the exotherm of the already curing polymer in the bulk material.

Whether added before or after polymerization and extrusion, the composite material of the invention contains a polymeric matrix phase that is strongly bonded to the dispersed reinforcing fibers, increasing the strength and stiffness of the resulting material. This enables the material to be used as a structural synthetic lumber, even at relatively low densities (e.g., about 20 to about 60 $lb/ft^3$).

Pigment or dye can be added to the polyol mixture or can be added at other points in the process. The pigment is optional, but can help make the composite material more commercially acceptable, more distinctive, and help to hide any scratches that might form in the surface of the material. Typical examples of pigments include iron oxide, typically added in amounts ranging from about 2 wt % to about 7 wt %, based on the total weight of the reaction mixture.

The inorganic particulate phase is an important feature of the invention, and is typically present in amounts ranging between about 45 wt % to about 85 wt % of the total composition. Increasing the proportion of inorganic particulate can lead to increased difficulty in mixing, making the inclusion of a surfactant more desirable. The inorganic particulate material should have less than about 0.5 wt % water (based on the weight of the particulate material) in order to avoid excessive or uncontrolled foaming.

It is generally desirable to use particulate materials with a broad particle size distribution, because this provides better particulate packing, leading to increased density and decreased resin level per unit weight of composite. Since the inorganic particulate is typically some form of waste or scrap material, this leads to decreased raw material cost as well. Particles having size distributions ranging from about 0.0625 in (or about 10 mesh) to below about 0.0017 in (or about 325 mesh) have been found to be particularly suitable.

Suitable inorganic particulates can include ground glass particles, fly ash, bottom ash, sand, granite dust, and the like, as well as mixtures of these. Fly ash is desirable because it is uniform in consistency, contains some carbon (which can provide some desirable weathering properties to the product due to the inclusion of fine carbon particles which are known to provide weathering protection to plastics, and the effect of opaque ash particles which block UV light, and contains some metallic species, such as metal oxides, which are believed to provide additional catalysis of the polymerization reactions. Ground glass (such as window or bottle glass) absorbs less resin, decreasing the cost of the composite. A 1:1 mixture of coal fly ash and bottom ash has also been found to be suitable as the inorganic particulate composition. In general, fly ash having very low bulk density (e.g., less than about 40 $lb/ft^3$) and/or high carbon contents (e.g., around 20 wt % or higher) are less suitable, since they are more difficult to incorporate into the resin system, and may require additional inorganic fillers that have much less carbon, such as foundry sand, to be added. Fly ash produced by coal-fueled power plants, including Houston Lighting and Power power plants, fly and bottom ash from Southern California Edison plants (Navajo or Mohave), fly ash from Scottish Power/Jim Bridger power plant in Wyoming, and fly ash from Central Hudson Power plant have been found to be suitable for use in the invention.

The process for producing the composite material may be operated in a batch, semibatch, or continuous manner. Mixing may be conducted using conventional mixers, such as Banbury type mixers, stirred tanks, and the like, or may be conducted in an extruder, such as a twin screw, co-rotating extruder. When an extruder is used, additional heating is generally not necessary, especially if liquid polyols are used. In addition, forced cooling is not generally required, except for minimal cooling to control excessive or runaway exotherms.

For example, a multi-zone extruder can be used, with polyols and additives introduced into the first zone, inorganic particulates introduced in the second zone, and chopped fibers, isocyanate, and pigments introduced in the fifth zone. A twin screw, co-rotating, extruder (e.g. 100 mm diameter, although the diameter can be varied substantially) can be used, with only water cooling (to maintain room temperature), and without extruder vacuum (except for ash dust). Liquid materials can be pumped into the extruder, while solids can be added by suitable hopper/screw feeder arrangements. Internal pressure build up in such an exemplary arrangement is not significant.

Although gelation occurs essentially immediately, complete curing can take as long as 48 hours, and it is therefore desirable to wait at least that long before assessing the mechanical properties of the composite, in order to allow both the composition and the properties to stabilize.

As explained above, the composite material of the invention is advantageously used in structural products, including synthetic lumber. The synthetic lumber may be formed in a batch, semibatch, or continuous fashion. For example, in continuous operation, polymerized (and polymerizing) material leaving the extruder (after optional incorporation of post-extruder fibers, tows, or rovings) is supplied to a forming system, which provides dimensional constraint to the material, and can be used to pattern the surfaces of the resulting synthetic lumber with simulated woodgrain or other designs, in order to make the material more commercially desirable. For example, a conveyor belt system comprising 2, 4, or 6 belts made from a flexible resin having wood grain or other design molded therein can be used. One such suitable system is described in copending U.S. patent application Ser. No. 10/764,013, filed on even date herewith, the entire contents of which are incorporated herein by reference. Desirably, the belts are formed from a self-releasing rubber or elastomeric material so that it will not adhere to the polymer composite. Suitable belt materials include silicone rubber, oil impregnated polyurethane, or synthetic or natural rubbers, if necessary coated with a release agent, such as waxes, silicones, or fluoropolymers.

For clarity of understanding, the invention will be described herein with respect to a single apparatus. It should be understood, however, that the invention is not so limited, and the system and method of the invention may involve two or more such systems operated in series or in parallel, and that a single system may contain multiple sets of belts, again operated in series or in parallel.

Flat-Belted Conveyor Channel

Each set of opposed flat belt conveyors are oriented so that their bearing surfaces face each other. One set of opposed flat belts can be thought of as "upper" and "lower" belts, although these descriptors are not limiting, nor do they require that the two opposed belts be horizontal. In practice, however, one set of opposed belts (the upper and lower belts) will be substantially horizontal. These belts can define the upper and lower surfaces of a mold cavity (when the device is operated in four-belt mode), or may provide support and drive surfaces for a set of opposed profile mold belts (when the device is operated in six-belt mode). The remaining set of opposed flat belts are disposed substantially orthogonal to the first set. As used herein, the term "substantially orthogonal" means close to perpendicular, but allowing for some deviation from 90° resulting from adjustment of the device, variations from level in the manufacturing floor, etc. This substantially orthogonal arrangement is accomplished in two basic configurations.

Figure 1B:
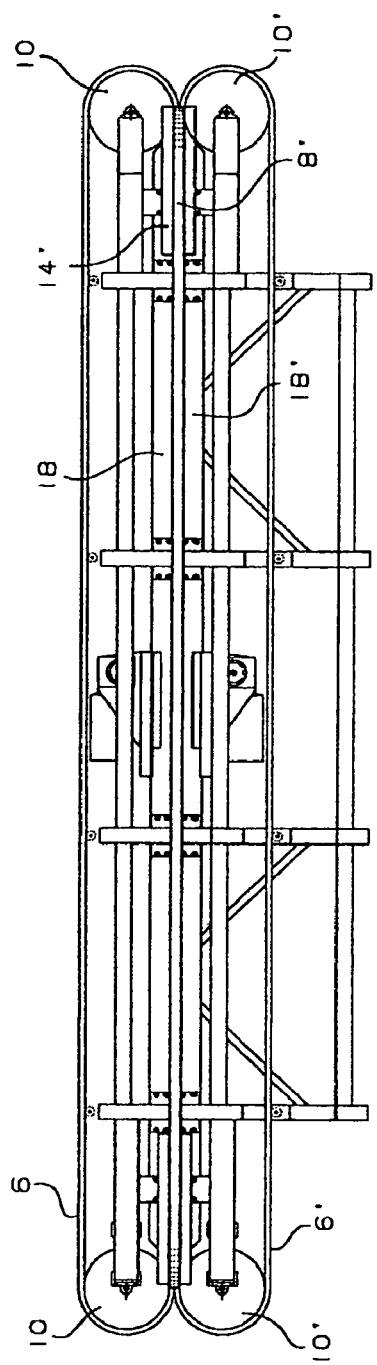
FIG. 1B is a side plan view.
Figure 1C:
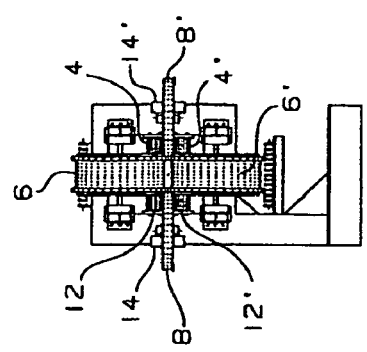
FIG. 1C is an end plan view of one embodiment of a system of the invention.
Figure 5:
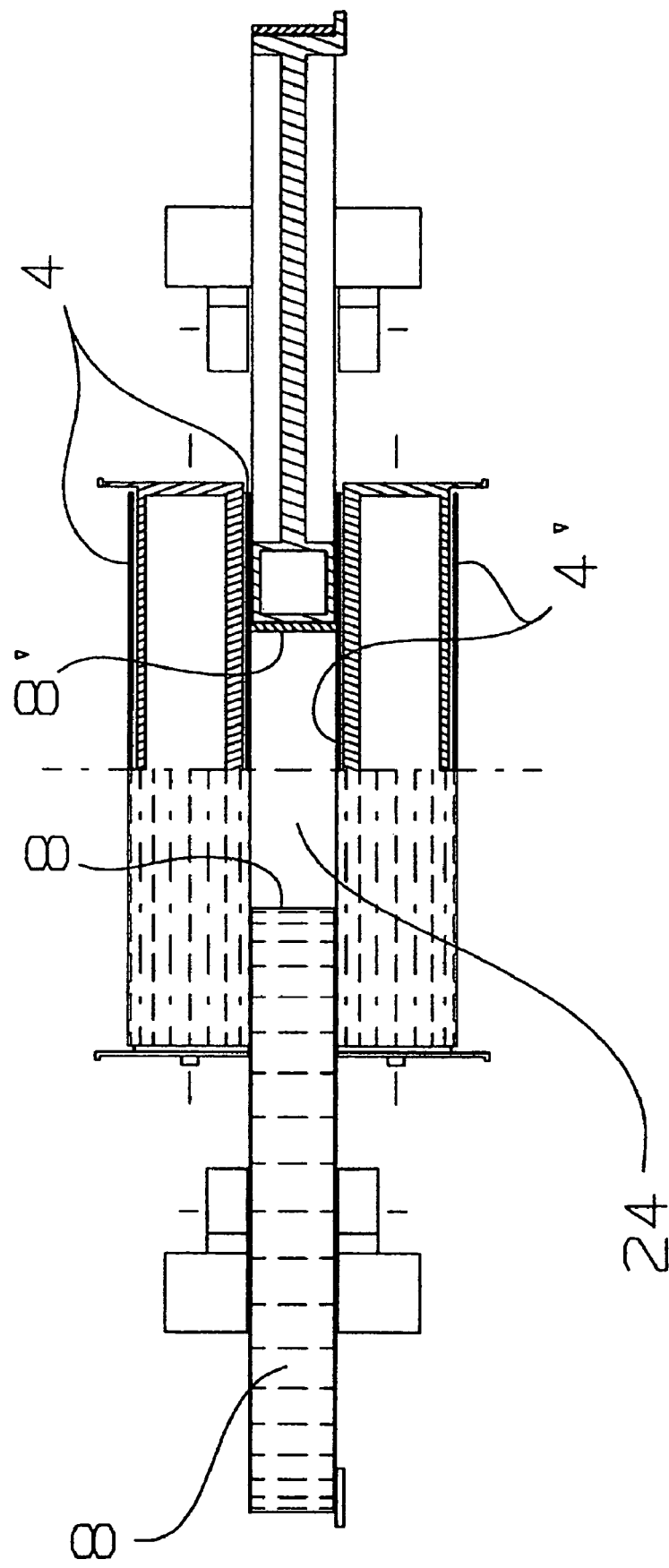
FIG. 5 is a partial sectional, partial end plan view of a four belt configuration of the system of the invention.

The first exemplary configuration involves disposing the flat bearing surfaces of the second set of belts along the sides of the space formed by the first set of belts, thereby forming an open-ended mold cavity that is enclosed by flat belts, and having a length corresponding to the length of the "side" belts. This configuration is illustrated in FIG. 5. FIG. 1A provides a top view, FIG. 1B a side view, and FIG. 1C an end view, of a system 2 having upper flat belt 4, lower flat belt 4', upper profile mold belt 6, lower profile mold belt 6', and side belts 8 and 8'. These side belts extend longitudinally approximately the same distance as the upper and lower flat belts, providing a mold cavity that is supported from the side over virtually the entire length of the profile mold belts. Profile mold belts 6 and 6' are maintained in tension by tensioning rolls 10. Flat belts 4 and 4' are powered by driven rollers 12 and 12'.

The arrangement of belts and the corresponding rollers for this exemplary configuration can be seen in more detail in FIG. 2, which is a partially expanded view, wherein the upper flat belt 4, upper profile mold belt 6, and corresponding supports and rollers 10 and 12, have been lifted away from the remainder of the system for ease of visualization. Side belts 8, 8' are supported by side belt supports 14 and 14', and can run on side belt support rollers 16, 16'. These side belt support rollers are powered, or unpowered, as illustrated in FIG. 2. In addition, upper and lower flat belts 4 and 4' are supported by rigid supporting surfaces, such as platens 18, 18'.

As mentioned above, each flat belt is supported by a slider-bed or platen comprised of a rigid metal plate or other rigid supporting surface, if the length of the belt makes such support necessary or desirable. Generally, in order to provide sufficient curing time for filled polyurethane foams, a support surface is desirable but not required. The surface of the slider-bed in one embodiment has a slippery coating or bed-plate material attached or bonded to it (for example, ultra-high molecular weight polyethylene, PTFE, or other fluoropolymer). Also, the belt has a slippery backing material (for example, ultra-high molecular weight polyethylene, PTFE or other fluoropolymer) to reduce friction between the bed and moving belt in an exemplary embodiment.

To further reduce friction and enhance cooling of the belts and conveyor machinery, the slider-beds and attached slippery surface material of a conveyor has a plurality of relatively small holes drilled through the surface. These holes are in fluid communication with a source of compressed gas, such as air. As an example, a plenum chamber is provided behind each slider bed, which is then connected to a source of pressurized air. Pressurized air fed into each plenum passes through the holes in the bed, and provides a layer of air between the bed and the adjacent belt. This air film provides lubrication between the bed and adjacent belt as shown in FIG. 2, where compressed air is supplied to the plenums through openings 20, 20'. The air fed into the plenums has a pressure higher than the foaming pressure of the product to be useful in reducing operating friction. In one embodiment, shop air or high-pressure blowers are used to provide the pressurized air to feed the plenums.

Figure 6:
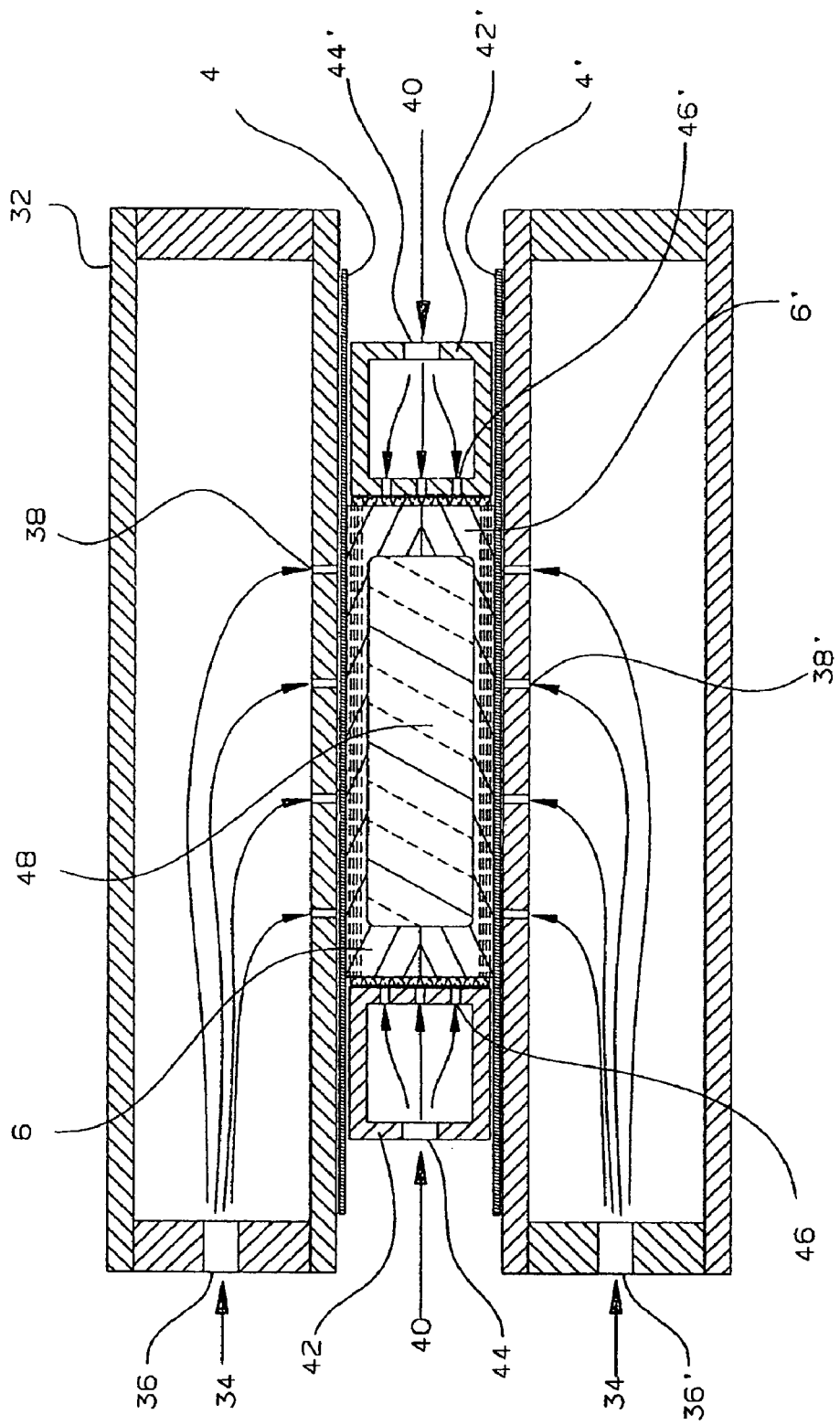
FIG. 6 is a sectional view of a configuration of the system of the invention using drive belts and supporting the sides of the mold belts with pressurized air.

In a more particular exemplary embodiment, shown in FIG. 6, air supply plenums are also used to provide support to the sides of the mold belts, either directly (shown) or through side belts (not shown). In FIG. 6, flat belts 4 and 4' are supported by upper and lower air supply plenums 32 and 32', respectively. Areas of contact between the belts and the plenums are prepared from or coated with a low-friction substance, such as PTFE, or are lubricated to lower the friction between the belts and the supporting surfaces. Pressurized air 34 is supplied to these plenums through openings 36, 36', and exits the plenums through openings 38, 38', where it flows under and supports flat belts 4, 4', which in turn support the upper and lower surfaces of profile mold belts 6, 6'. In addition, pressurized air 40 enters side plenums 42, 42' through openings 44, 44'. The air leaves these side plenums through opening 46, 46', and flows against and supports the sides of profile mold belts 6, 6'. This support can result either from the air flow impinging directly on the sides of the mold belts, or from air flow impinging on the surfaces of side belts that in turn press against the sides of the profile mold belts. The profile mold belts, in turn, provide support to the material being formed, 48.

The flat-belts are powered and driven at matching speeds with respect to one another. The matched speed are achieved, in one embodiment, by mechanical linkage between the conveyors or by electronic gearing of the respective motors. Alternatively, as illustrated in FIGS. 1 and 2, only two flat belts are driven (for example, the two opposing belts with greater contact area, which are typically the upper and lower belts) with the remaining two flat belts (for example, the side belts) un-driven and idling. The flat-belts form a relatively rigid moving channel through which contoured mold-belts and/or forming product is moved and contained.

The driven flat-belts utilize known driven roller technologies, including center-drive pulley mechanisms, whereby more than 180° of contact is maintained between each conveyor's driving pulley and belt, increasing the amount of force that may be delivered to the belt.

Figure 3B:
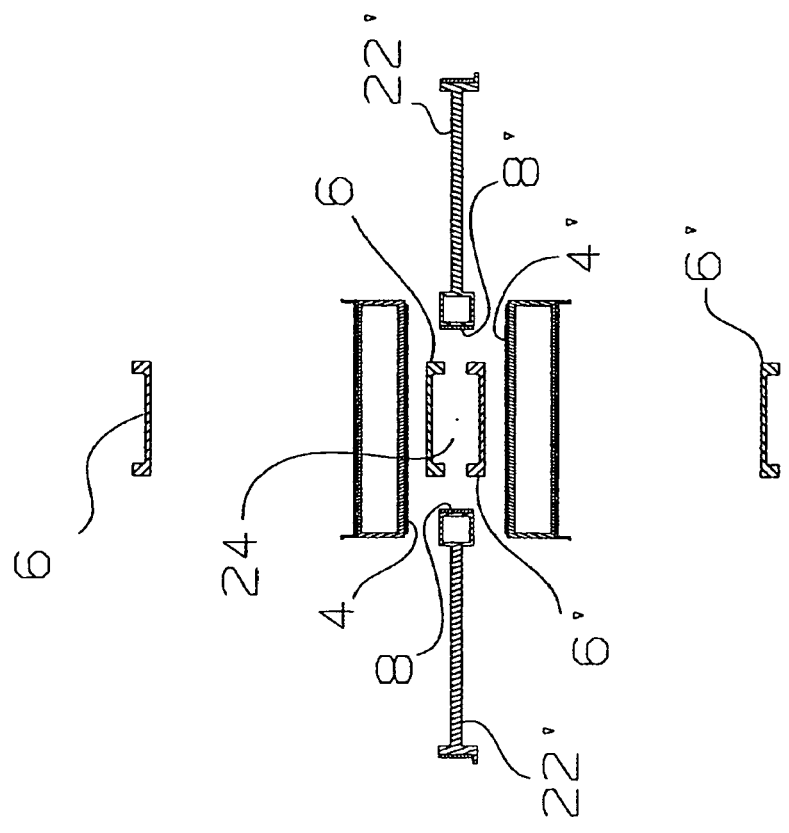
FIG. 3B is an exploded sectional view of the system of FIG. 3A.
Figure 3A:
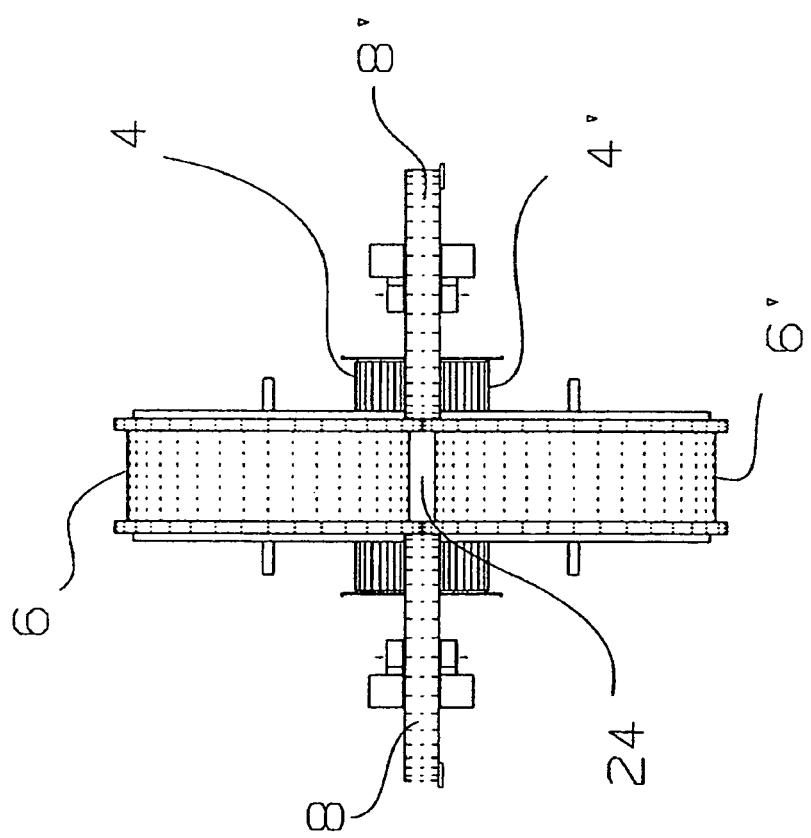
FIG. 3A is an end plan view of one embodiment of the system of the invention.

In another exemplary configuration, the side flat belts are disposed substantially orthogonal relative to the upper and lower flat belts such that their bearing surfaces face each other, and are in a plane substantially perpendicular to the plane of the bearing surfaces of the upper and lower belts, as illustrated in FIG. 3. FIG. 3A is an end view with the corresponding drive and support apparatus removed for ease of viewing. FIG. 3A shows side flat belts 8 and 8' disposed between upper flat belt 4 and lower flat belt 4'. An expanded sectional view of this exemplary configuration is provided in FIG. 3B. The frames 22 and 22' supporting the side belts are restrained in such a way as to allow the position of the side flat belts to be adjusted laterally providing the desired degree of pressure against the sides of profile mold belts 6 and 6' or to accommodate mold belts of alternate widths. This configuration provides a relatively short, but highly contained mold cavity 24.

Mold-Belts

Figure 4:
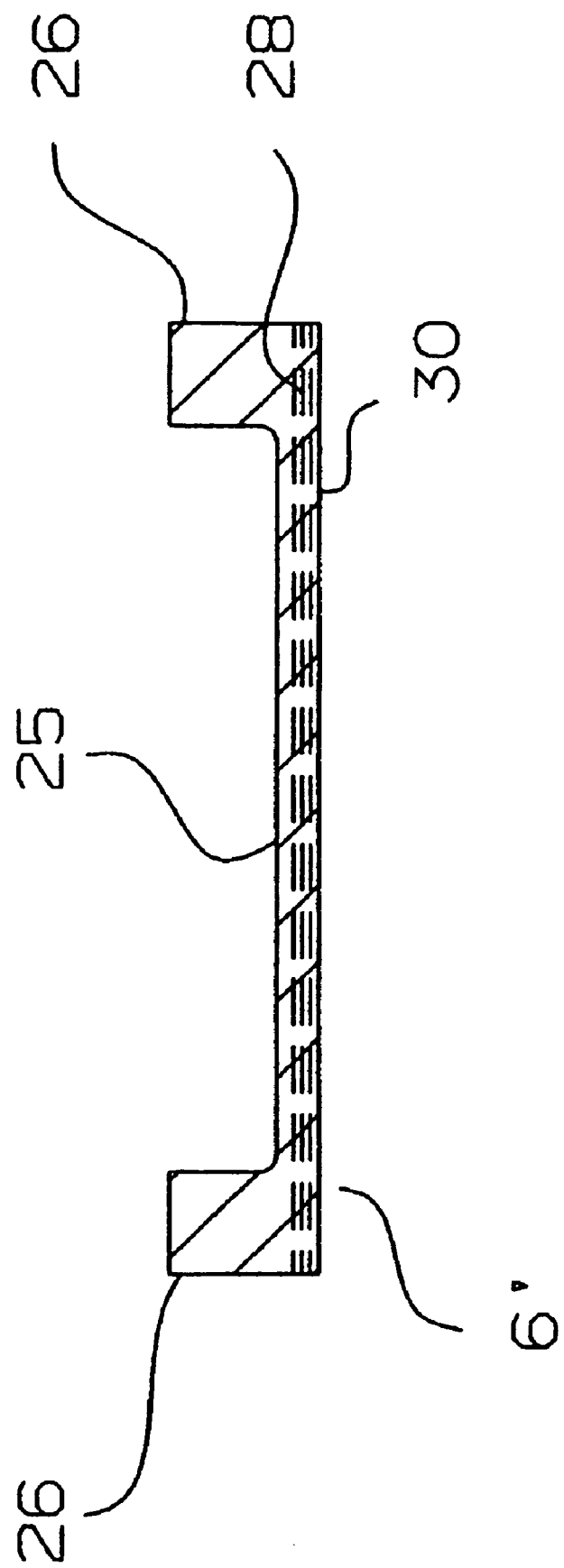
FIG. 4 is a sectional view of a profile mold belt used in certain embodiments of the system of the invention.

The contoured mold-belts are relatively thick belts with a rubbery face material attached to a fiber-reinforced backing or carcass as shown in FIG. 4. The profile mold belt 6' is constructed to contain an inner surface 25, that defines part of mold cavity 24. It also has side surfaces 26, which contact side flat belts 8, 8', and outer surface 30, which contacts the inner surface of flat belt 4'. The fiber-reinforcement 28 in the backing of the belts will provide the strength and rigidity in the belt while the face material has the profile, surface features, and texture that is molded into the product. The desired mold profile, surface features, and texture are machined, cut, bonded, and/or cast into the surface of the mold-belts. The mold cavity created by the mold belts has a constant, irregular, and/or segmented cross section. Multiple cavities can be incorporated into a single set of mold belts. Suitable mold surface materials include, but are not restricted to Nitrile, Neoprene, polyurethane, silicone elastomers, and combinations thereof. Suitable fibers for reinforcing the profile mold belt include cotton, aramid, polyester, nylon, and combinations thereof.

Each profile mold-belt travels beyond the ends of the surrounding flat-belt conveyors to a separate set of large pulleys or rollers that maintain tension and the relative position of each belt. In one embodiment, the mold-belts are un-powered, functioning as idlers or slave belts to the powered flat belts behind them. In another embodiment, the mold belts are separately powered.

The temperature of the mold belts can be adjusted during production in the event that additional heat is needed or surplus heat is to be removed. If the temperature of the belt surface is adjusted, temperature controlled air is blown onto the belt surfaces as the belts exit the flat-belted conveyor enclosure and follow their return path to the entrance of the forming machine. In one embodiment, infrared or other radiant heaters are used to increase the temperature of the mold surface. In another embodiment, temperature controlled air or other fluid is routed through the conveyor frames to maintain predetermined process temperatures.

Orientation

As described above, the exemplary orientation of the forming system is for the contact surface between mold-belts to be horizontal. The gap between the upper and lower flat-belted conveyors (those conveyors adjacent to the backs of the mold-belts), can be precisely maintained such that the pair of mold-belts pass between them without being allowed to separate (presenting a gap to the molding material) and without excessively compressing the mold-belt shoulders or side walls. In the exemplary embodiment, the upper conveyor is removable while not in operation in order to permit replacement of the mold belts.

Side Conveyors

The flat-belted conveyors adjacent to the sides of the profile mold belts provide structural support for the sides of the mold cavity, resist any deflection of the sides due to foaming pressure, and maintain alignment of the mold-belts. These side-supporting conveyors permit the use of thinner mold-belt sidewalls, which reduces the cost and mass of the mold-belts. The use of these side-supporting conveyors also permits the molding of deeper product cross sections without requiring excessive mold-belt widths.

System Versatility

An exemplary configuration for the flat-belted conveyors is for the top and bottom conveyors to be wide, with the side conveyors sized to fit between the belts of the upper and lower conveyors in such a way that the surface of the upper and lower (wide) belts approach or make contact with the edges of the side belts. The frames, pulleys, and slider-beds of the side conveyors are slightly narrower than their respective belts to avoid contact with the upper and lower belts. A cross section of this exemplary configuration is shown in FIG. 3B as described above. With this orientation, the gap between the side conveyors is adjustable in order to accommodate wider or narrower pairs of mold-belts. This configuration permits a range of product widths to be produced by the same forming machine. Only the mold-belt set is replaced in order to produce product of a different width.

To further increase the versatility of the forming machine, the side conveyor belts, pulleys, and slider beds are replaced with taller or shorter components and the gap between upper and lower conveyors adjusted accordingly. This feature permits the forming machine to accommodate mold-belts of various depths to produce thicker or thinner cross sections.

Four-Belt Mode

The specific exemplary embodiments described above with respect to the drawings generally relate to configuration of the system in "six belt mode." In other words, an upper and lower flat belt, two side flat belts, and an upper and lower profile mold belt. The mold belts permit surface details, corner radii, irregular thicknesses, and deeper surface texture to be molded into the continuously formed product. However, for rectangular or square cross-sectioned products that do not require corner radii, deep texture, or localized features, the forming system is used without mold-belts, and operated in "four belt mode." In this exemplary operating configuration the four flat belts make direct contact with the moldable product and permits the product to form within the flat-sided cavity. When the forming system is used in this configuration it is important that the upper and lower belts maintain contact with the edges of the side belts to prevent seepage of the material between adjacent belts. In order to produce thicker or thinner products in "four belt mode" the side flat belts, adjacent slider beds, and side belt pulleys are replaced with components in the target thickness. The gap between side belts is adjusted to accommodate the target width. Using this approach a large variety of four-sided cross-sections can be produced by the same machine without the added cost of dedicated mold-belts.

The four belt configuration is illustrated in FIG. 5. The sectional portion of the drawing shows that the mold cavity 24 is formed by the surfaces of upper and lower flat belts 4, 4' and the surfaces of side belts 8, 8'.

Fabrication

The forming system structure may be fabricated using metal materials and typical metal forming and fabricating methods such as welding, bending, machining, and mechanical assembly.

The forming system is used to form a wide variety of moldable materials, and has been found to be particularly suitable for forming synthetic lumber.

Representative suitable compositional ranges for synthetic lumber, in percent based on the total composite composition, are provided below:

| | |
|---|---|
| Rigid polyol | about 6 to about 18 wt % |
| Flexible polyol | 0 to about 10 wt % |
| Surfactant | about 0.2 to about 0.5 wt % |
| Skin forming catalyst | about 0.002 to about 0.01 wt % |
| Gelation catalyst | about 0.02 to about 0.1 wt % |
| Water | 0 to about 0.5 wt % |
| Chopped fiberglass | 0 to about 10 wt % |
| Pigments | 0 to about 6 wt % |
| Inorganic particulates | about 60 to about 85 wt % |
| Isocyanate | about 6 to about 20 wt % |
| Axial tows | 0 to about 6 wt %. |

The invention can be further understood by reference to the following non-limiting examples.

Example 1

A polymer composite composition was prepared by introducing 9.5 wt % rigid polyol (MULTRANOL 4035, Bayer), 0.3 wt % rubber polyol (ARCOL LG-56, Bayer), 0.3 wt % surfactant/wetting agent (DC-197, Air Products), 0.005 wt % film forming organic tin catalyst (UL-28/22, Air Products), 0.03 wt % amine gelation catalyst (33LV, Air Products), and 0.05 wt % water as foaming agent to the drive end of a 100 mm diameter twin screw co-rotating extruder with water cooling to maintain room temperature. At a point around 60% of the length of the extruder, 4.2 wt % chopped glass fibers (Owens Corning) with ¼ to ½ inch lengths were added, along with 4.0 wt % brown pigment (Interstar), 74 wt % fly ash (ISG), and 9.6 wt % isocyanate (MONDUR MR Light, Bayer). The extruder was operated at room temperature (75° F.), at 200 rpm for one hour. Following extrusion, 0.4 wt % of a resin mixture of rubbery polyol (ARCOL LG-56, Bayer), and isocyanate (MONDUR MR Light, Bayer) were added to the surface of the extruded material to provide a bonding adhesive for glass tows. The glass tows (Owens Corning) ¼ to ½ inch length were added in an amount of around 2 wt % to provide added rigidity, and were added just below the surface of the material produced by the extruder.

The resulting composite material was particularly useful as synthetic decking material.

Example 2

In a batch reactor, 16.4 wt % rigid polyol (Bayer 4035) was combined with 1.9 wt % flexible polyol (Bayer 3900), 0.2 wt % surfactant (DC-197), water, 3.2 wt % pigments, 0.0001 wt % UL-28 organic tin catalyst, and 0.1 wt % 33LV amine catalyst, and thoroughly mixed for 1 minute. 31.5 wt % Wyoming fly ash was then added and mixed for an additional 1 minute. Finally, 17.3 wt % isocyanate (1468A, Hehr), 0.9 wt % chopped brown fiber, 3.5 wt % chopped glass (0.25 in. diameter), and an additional 25.2 wt % Wyoming fly ash were added and mixed for 30 seconds. The resulting material had a resin content of 36%, a ratio of rigid to rubbery polyol of 90%, a solids content of 64%, a 10% excess isocyanate content, and a fiber content of 4.4%, all by weight based on the total composition unless noted otherwise. The resulting material was suitable for forming synthetic lumber boards.

Example 3

In a batch reactor, 16.4 wt % rigid polyol (Bayer 4035) was combined with 1.9 wt % flexible polyol (Bayer 3900), 0.2 wt % surfactant (DC-197), water, 3.2 wt % pigments, 3.5 wt % chopped glass (0.25 in. diameter), around 0.4 wt % Mohave bottom ash, 0.0001 wt % UL-28 organic tin catalyst, and 0.1 wt % 33LV amine catalyst, and thoroughly mixed for 1 minute. 31.5 wt % Wyoming fly ash was then added and mixed for an additional 1 minute. Finally, 17.3 wt % isocyanate (1468A, Hehr), 0.9 wt % chopped brown fiber, and an additional 25.2 wt % Wyoming fly ash were added and mixed for 30 seconds. The resulting material had a resin content of 36%, a ratio of rigid to rubbery polyol of 90%, a solids content of 64%, a 10% excess isocyanate content, and a fiber content of 4.4%, all by weight based on the total composition unless noted otherwise. The resulting material was suitable for forming synthetic lumber boards.

For each of Examples 2 and 3, water was added in amounts shown below (in percent based on total polyol added); physical properties of the resulting material were tested, and the results provided below. The 200 lb impact test was conducted by having a 200 lb man jump on an 18 inch span of synthetic lumber board 2×6 inches. supported above the ground from a height of about 1 ft in the air, and evaluating whether the board breaks.

| Example | H$_2$O (% of polyol) | Density (lb/ft$^3$) | Break Strength (psi) | 100 psi Deflection (in) | Hardness (Durometer C) | Flexural Strength (psi) | Flexural Modulus (psi) | 200 lb impact test (P/f) |
|---|---|---|---|---|---|---|---|---|
| 2 | 0.10 | 63 | 730 | 0.15 | 62 | 3129 | 118,331 | P |
| 2 | 0.23 | 59 | 650 | 0.15 | 57 | 2786 | 118,331 | P |
| 2 | 0.40 | 47 | 450 | 0.15 | 52 | 1929 | 118,331 | F |
| 3 | 0.10 | 63 | 810 | 0.15 | 62 | 3472 | 118,331 | P |

Example 4

Fiberglass rovings (Ahlstrom, 0.755 g/ft) or brown basalt rovings (0.193 g/ft) were positioned in a 24 inch mold for 2×4 inch synthetic lumber, and stabilized to limit movement relative to the mold surface (about 0.125 in. in from the mold surface) and to keep them taut. The rovings were applied dry, coated and pre-cured with the synthetic lumber composition (minus ash and chopped glass), and wet with a mixture of 49 wt % rigid polyol (MULTRANOL 4035), 0.098 wt % surfactant (DC-197), 0.20 wt % amine catalyst (33LV), and 49.59 wt % isocyanate (Hehr 1468A).

To the mold was added a synthetic lumber mixture, formed by combining 16.6 wt % rigid polyol (MULTRANOL 4035), 5.5 wt % flexible polyol (MULTRANOL 3900), 0.16 wt % surfactant (DC-197), 0.07 wt % water, 3.7 wt % pigments, 0.003 wt % organic tin catalyst (UL-28, Air Products), and 0.1 wt % amine catalyst (33LV), and mixing for 1 minute, then adding 26.4 wt % Wyoming fly ash, mixing for 1 minute, and finally adding 20.4 wt % isocyanate (MRS4, Bayer), 1.1 wt % chopped brown fiber, 3.4 wt % chopped 0.25 in. fiberglass, and 22.5 wt % Wyoming fly ash, and mixing for 30 seconds.

The physical properties of the resulting boards were assessed, and are indicated below. Control boards were also prepared to different densities, and their physical properties evaluated as well. The axially oriented rovings greatly increased flexural strength, with little added weight. The rovings tend to have a more pronounced strengthening effect as the load on the material is increased.

| Roving type | Number of rovings | Roving coating | Density (lb/ft³) | Flexural strength (psi) | Flexural Modulus @ 100 psi (Ksi) | Flexural Modulus @ 200 psi (Ksi)) |
|---|---|---|---|---|---|---|
| Basalt | 10 | Dry | 41 | 1191 | 73 | 53 |
| Fiberglass | 10 | Pre-cured resin | 58 | 4000 | 188 | 135 |
| Fiberglass | 10 | Dry | 62 | 5714 | 339 | 169 |
| Basalt | 40 | Dry | 49 | 2465 | 96 | 101 |
| Basalt | 40 | Dry | 31 | 1650 | 62 | 165 |
| Fiberglass | 10 | Dry | 32 | 2717 | 37 | 57 |
| Fiberglass | 10 | Wet | 36 | 3533 | 77 | 93 |
| Fiberglass | 5 | Wet | 36 | 2410 | 64 | 71 |
| Fiberglass | 15 | Wet | 38 | 4594 | 171 | 80 |
| Fiberglass | 20 | Wet | 35 | 4356 | 84 | 80 |
| None | | | 55 | 1808 | 147 | 98 |
| None | | | 66 | 4724 | 121 | 100 |
| None | | | 68 | — | 169 | 135 |
| None | | | 59 | 2568 | 70 | 84 |
| None | | | 45 | 1319 | 82 | 62 |
| None | | | 35 | 1174 | 56 | 63 |
| None | | | 41 | 746 | 59 | 0 |

The synthetic lumber produced by the invention was found to have good fire retardant properties, achieving a flame spread index of 25, and to produce only small quantities of respirable particles of size less than 10 μm when sawn. It provides excellent compressive strength, screw and nail holding properties, and density. Extruded composite of the invention generally provides mechanical properties that are even better than those provided by molded composite.

What is claimed is:

1. A method of continuously forming a molded material comprising:
   mixing a highly filled composite mixture in a multi-zone extruder essentially at room temperature and without adding heat, wherein the composite mixture comprises:
   a monomeric or oligomeric poly or di-isocyanate;
   a first liquid polyol having a first molecular weight and a second polyol having a second molecular weight higher than the first molecular weight, wherein the second liquid polyol comprises about 5 wt % to about 20 wt % of the total weight of the first and second polyols;
   wherein the first polyol has a viscosity in the range of about 480 cP to about 840 cP at 25° C., and the second polyol viscosity is in the range of about 480 cP to about 840 cP at 25° C.;
   a foaming agent;
   an inorganic particulate material comprising about 60 wt % to about 85 wt % of the composite mixture; and
   a catalyst;
   extruding the highly filled composite mixture through a die;
   molding the mixture in a forming system comprising:
   at least a first and a second opposed mold belt, each having an inner surface and an outer surface;
   at least a first and a second opposed endless belt spaced apart a distance, each having an inner surface and an outer surface, wherein the inner surface of the first belt is contactable with the outer surface of the first mold belt to move with and support the first mold belt during molding, and wherein the inner surface of the second belt is contactable with the outer surface of the second mold belt to travel with and support the second mold belt during molding;
   a mold cavity disposed between the inner surfaces of the at least two opposed mold belts; and
   removing the molded material from the mold cavity after sufficient time has passed for the mixture to cure or harden into the molded material, wherein the molded material comprises a density of at least about 30 lb/ft³.

2. The method of claim 1, further comprising transferring the mixture along the mold cavity.

3. The method of claim 1, wherein the forming system further comprises a drive mechanism for imparting motion to the at least two opposed endless belts.

4. The method of claim 1, further comprising exerting pressure on the mixture with the at least two opposed endless belts.

5. The method of claim 1, further comprising providing shape, surface features, or both to the molded material.

6. The method of claim 1, further comprising embossing or impressing a pattern on the mixture in the forming system.

7. The method of claim 6, wherein the pattern comprises a simulated wood grain.

8. The method of claim 1, further comprising introducing fiber rovings on, in, or beneath the surface of the mixture.

9. The method of claim 8, wherein the fiber rovings are axially oriented fiber rovings.

10. The method of claim 1, wherein the inorganic particulate material is fly ash, bottom ash, or particulate glass.

11. The method of claim 1, wherein the inorganic particulate material has a particle size distribution ranging from about 0.0625 in. to below about 0.0017 in.

12. The method of claim 1, wherein the inorganic particulate material contains less than about 0.5 wt % water.

13. The method of claim 1, wherein the polyol is mixed with the catalyst prior to being mixed with the isocyanate.

14. The method of claim 1, wherein the polyol and the catalyst are mixed prior to being introduced to the extruder.

15. The method of claim 1, wherein the polyol, the catalyst, and the inorganic particulate material are mixed prior to being mixed with the isocyanate.

16. The method of claim 1, wherein the molded material is a building material.

17. The method of claim 16, wherein the building material is lumber.

18. The method of claim 16, wherein the building material is roofing.

19. The method of claim 16, wherein the building material is siding.

20. The method of claim 16, wherein the building material comprises a relatively porous material and a relatively non-porous toughening layer disposed on and adhered to the porous material.

21. The method of claim 1, wherein the outer surface of the at least opposed endless belts is supported by a rigid supporting surface.

22. The method of claim 21, wherein the opposed endless belts are upper and lower endless belts.

23. The method of claim 21, wherein the rigid supporting surface comprises a slider bed or platen.

24. The method of claim 1, wherein the opposed endless belts are adjustable such that the mold cavity can be varied.

25. The method of claim 1, wherein at least two endless opposing profile mold belts are adapted to fit within the mold cavity.

26. The method of claim 25, wherein the mold cavity is at least partly defined by the inner surfaces of the at least two opposed profiled mold belts disposed inside the at least two opposed endless belts.

27. The method of claim 26, wherein the profile mold belts form the mixture into a shape having a cross-section at least approximately corresponding to that of the mold cavity.

28. The method of claim 26, wherein the profile mold belts impart a surface pattern to the molded material.

29. A method of continuously forming a molded material comprising:
    forming a highly filled composite mixture in a continuous mixing device, wherein the composite mixture comprises:
        a monomeric or oligomeric poly or di-isocyanate;
        a first polyol having a first molecular weight;
        a second polyol having a second molecular weight lower than the first molecular weight, wherein the second polyol comprises about 5 wt % to about 20 wt % of the total weight of the first and second polyols;
        wherein the first polyol has a viscosity, in the range of about 480 cp to about 840 cP at 25° C., and the second polyol has a viscosity in the range of about 480 cp to about 840 cP at 25° C.;
        a foaming agent;
        inorganic particulate material comprising about 60 wt % to about 85 wt % of the composite mixture; and
        a catalyst;
        wherein the exothermic reaction is allowed to proceed without additional heat and without forced cooling except to control runaway exotherm;
    passing the mixture through the exit of the continuous mixing device;
    molding the mixture in a forming system comprising:
        at least two opposed endless belts spaced apart a distance, each having an inner surface and an outer surface;
        a mold cavity defined at least in part by the inner surfaces of the at least two opposed endless belts; and
    removing the molded material from the mold cavity after sufficient time has passed for the mixture to cure or harden into the molded material, wherein the molded material comprises a density of at least about 30 lb/ft$^3$.

30. The method of claim 29, wherein the first and second polyol are mixed prior to being introduced to the continuous mixing device.

31. The method of claim 29, wherein the first and second polyol are mixed with the catalyst prior to being mixed with the isocyanate.

32. The method of claim 29, wherein at least one of the first or second polyols is mixed with the catalyst prior to being introduced to the extruder.

33. The method of claim 29, wherein the first polyol, the second polyol, the catalyst, and the inorganic particulate material are mixed prior to being mixed with the isocyanate.

34. The method of claim 1, wherein the composition mixture has a density in the range of about 20 lb/ft$^3$ to about 90 lb/ft$^3$.

35. The method of claim 1, wherein the poly- or di-isocyanate comprises methylene diphenyl diisocyanate.

36. The method of claim 29, wherein the molded material comprises a density of about 40 lb/ft$^3$.

37. The method of claim 29, wherein the molded material comprises a density of about 50 lb/ft$^3$.

38. The method of claim 29, wherein the molded material comprises a density of about 60 lb/ft$^3$.

39. The method of claim 29, wherein the second polyol comprises about 10 wt % of the total weight of the first and second polyols.

40. The method of claim 29, wherein the inorganic particulate material comprises about 74 wt % of the composite mixture.

41. The method of claim 29, wherein the composite mixture further comprises fibers.

42. The method of claim 41, wherein the fibers comprise about 4 wt % of the composite mixture.

43. The method of claim 29, wherein the continuous mixing device comprises an extruder.

44. The method of claim 29, wherein the step of passing the mixture through the exit of the continuous mixing device comprises the step of pouring the mixture.

* * * * *